(12) United States Patent
Mizusaki et al.

(10) Patent No.: US 9,484,584 B2
(45) Date of Patent: *Nov. 1, 2016

(54) PRODUCTION METHOD OF ELECTRODE CATALYST, ELECTRODE CATALYST, COMPOSITION FOR FORMING GAS DIFFUSION ELECTRODE, GAS DIFFUSION ELECTRODE, MEMBRANE-ELECTRODE ASSEMBLY (MEA), AND FUEL CELL STACK

(71) Applicant: N.E. Chemcat Corporation, Tokyo (JP)

(72) Inventors: Tomoteru Mizusaki, Bando (JP); Kiyotaka Nagamori, Bando (JP); Yoko Nakamura, Bando (JP); Takuya Tsubaki, Bando (JP)

(73) Assignee: N. E. CHEMCAT Corporation, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/023,081

(22) PCT Filed: Mar. 27, 2015

(86) PCT No.: PCT/JP2015/059812
§ 371 (c)(1),
(2) Date: Mar. 18, 2016

(87) PCT Pub. No.: WO2015/147310
PCT Pub. Date: Oct. 1, 2015

(65) Prior Publication Data
US 2016/0226078 A1    Aug. 4, 2016

(30) Foreign Application Priority Data
Mar. 28, 2014    (JP) .................. 2014-070628

(51) Int. Cl.
| | |
|---|---|
| *B01J 23/38* | (2006.01) |
| *B01J 23/42* | (2006.01) |
| *B01J 23/52* | (2006.01) |
| *B01J 23/755* | (2006.01) |
| *B01J 37/00* | (2006.01) |
| *H01M 4/92* | (2006.01) |
| *B01J 37/16* | (2006.01) |
| *B01J 23/44* | (2006.01) |
| *B01J 35/08* | (2006.01) |
| *H01M 4/88* | (2006.01) |
| *H01M 4/90* | (2006.01) |
| *H01M 4/86* | (2006.01) |
| *H01M 8/10* | (2016.01) |

(52) U.S. Cl.
CPC ............ *H01M 4/926* (2013.01); *B01J 23/44* (2013.01); *B01J 35/08* (2013.01); *B01J 37/16* (2013.01); *H01M 4/8605* (2013.01); *H01M 4/88* (2013.01); *H01M 4/9041* (2013.01); *H01M 4/9083* (2013.01); *H01M 4/921* (2013.01); *H01M 8/1002* (2013.01); *H01M 8/1004* (2013.01); *H01M 2008/1095* (2013.01); *Y02E 60/50* (2013.01); *Y02P 70/56* (2015.11)

(58) Field of Classification Search
CPC .......... H01M 4/8657; H01M 4/8825; H01M 4/926; H01M 4/921; B01J 23/38; B01J 23/42; B01J 23/44; B01J 23/52; B01J 23/755; B01J 23/892; B01J 35/0033; B01J 35/008; B01J 35/0086; B01J 37/00
USPC ........ 502/101, 184, 337, 339, 344; 420/463, 420/466, 468, 507–510
See application file for complete search history.

(56) References Cited

U.S. PATENT DOCUMENTS

| | | | |
|---|---|---|---|
| 2006/0042957 A1 | 3/2006 | He | |
| 2007/0281160 A1* | 12/2007 | Krishna | ............. B01D 69/02 428/403 |
| 2010/0197488 A1* | 8/2010 | Hagemeyer | ............. B01J 2/16 502/242 |
| 2011/0275009 A1* | 11/2011 | Goto | .................. B01J 23/42 429/506 |
| 2013/0189607 A1* | 7/2013 | Sakai | .................. B01J 21/063 429/524 |

| | | | |
|---|---|---|---|
| 2014/0349203 | A1* | 11/2014 | Klose-Schubert .... H01M 4/923 429/418 |
| 2015/0037711 | A1* | 2/2015 | Cho .................. B22F 1/025 429/523 |
| 2015/0372313 | A1* | 12/2015 | Shao .................. B01J 23/44 429/524 |

FOREIGN PATENT DOCUMENTS

| | | |
|---|---|---|
| JP | 2002249488 A | 9/2002 |
| JP | 2003129102 A | 5/2003 |
| JP | 2008511534 A | 4/2008 |
| JP | 2008126211 A | 6/2008 |
| JP | 2008293737 A | 12/2008 |
| JP | 2009238560 A | 10/2009 |
| JP | 2010214330 A | 9/2010 |
| JP | 2011526655 A | 10/2011 |
| JP | 2011218278 A | 11/2011 |
| JP | 2013215701 A | 10/2013 |
| JP | 2014239033 A | 12/2014 |
| WO | 2006026144 A1 | 3/2006 |
| WO | 2011115012 A1 | 9/2011 |
| WO | 2014181873 A1 | 11/2014 |

OTHER PUBLICATIONS

Matsuoka et al., "Degradation of Polymer Electrolyte Fuel Cells under the Existence of Anion Species", J. Power Sources, May 1, 2008, vol. 179 No. 2, p. 560-565.

PCT International Search Report mailed on Jun. 23, 2015 issued in corresponding PCT Application No. PCT/JP2015/059812.

* cited by examiner

*Primary Examiner* — Patricia L Hailey

(74) *Attorney, Agent, or Firm* — Troutman Sanders LLP

(57) ABSTRACT

Provided is an electrode catalyst production method capable of obtaining, through an easy operation, an electrode catalyst whose chlorine (Cl) species content has been reliably and sufficiently reduced, even when using as an electrode catalyst raw material an electrode catalyst precursor containing a high concentration of chlorine.

The method is to produce an electrode catalyst having a core-shell structure including a support, a core part formed on the support and a shell part formed to cover at least a part of a surface of the core part. The method includes a first step (1) of retaining a liquid containing ultrapure water, a reductant such as a hydrogen-containing gas and an electrode catalyst precursor under at least one stage of a predetermined temperature for a predetermined retention time, such electrode catalyst precursor being produced using a material containing chlorine (Cl) species, and exhibiting a chlorine (Cl) species concentration not lower than a predetermined first chlorine (Cl) species concentration when measured by X-ray fluorescence (XRF) spectroscopy.

26 Claims, 8 Drawing Sheets

PRODUCTION METHOD OF ELECTRODE CATALYST, ELECTRODE CATALYST, COMPOSITION FOR FORMING GAS DIFFUSION ELECTRODE, GAS DIFFUSION ELECTRODE, MEMBRANE-ELECTRODE ASSEMBLY (MEA), AND FUEL CELL STACK

CROSS-REFERENCE TO RELATED APPLICATIONS

This application is a U.S. National Stage of International Application No. PCT/JP2015/059812, filed Mar. 27, 2015, which claims the benefit of Japanese Patent Application No. 2014-070628, filed Mar. 28, 2014, the entire contents of each of which are hereby incorporated by reference.

TECHNICAL FIELD

The present invention relates to a production method of electrode catalyst. Also, the present invention relates to an electrode catalyst obtained by the production method of the electrode catalyst, a composition for forming a gas diffusion electrode including the electrode catalyst, a gas diffusion electrode, a membrane-electrode assembly (MEA), and a fuel cell stack.

BACKGROUND ART

A so-called polymer electrolyte fuel cell (Polymer Electrolyte Fuel Cell: hereinafter called "PEFC" as needed), has its operating temperature of from a room temperature to about 80° C. Also, since PEFC makes it possible to employ inexpensive general-purpose plastics, etc. for members constituting its fuel cell body, it is possible to realize reduction in weight. Furthermore, PEFC makes it possible to achieve thinning of a polymer electrolyte membrane, enabling an electric resistance to be reduced, thereby enabling a power loss to be reduced relatively easily. Due to PEFC having not a few advantages as described above, it is applicable to a fuel cell vehicle, a home cogeneration system, and the like.

As an electrode catalyst for PEFC, there has been proposed an electrode catalyst in which a platinum (Pt) or platinum (Pt) alloy, i.e., a component for the electrode catalyst, is supported on a carbon serving as a support (for example, Non-Patent Document 1).

Conventionally, there have been disclosed that, as for an electrode catalyst for PEFC, if the content of chlorine contained in the electrode catalyst is 100 ppm or more, it is not desirable as an electrode catalyst (for example, Patent Document 3); and that this is because if the content of chlorine contained in the electrode catalyst is 100 ppm or more, it is impossible to obtain a sufficient catalytic activity for the electrode catalyst for fuel cells; and corrosion of its catalyst layer will occur, thus shortening the life of the fuel cell.

Then, there is proposed a PEFC equipped with a membrane electrode assembly with electrodes joined on both sides of an electrolyte membrane, in which acid radical protons contained in an inner-catalyst-layer electrolyte are partially exchanged by phosphonium ion (for example, Patent Document 1). In the PEFC, the counter anion of the phosphonium ion is a compound containing no halogen elements. The reason, as disclosed therein, is because a halogen element causes degradation in battery performance if it remains in the electrode.

Also, there is proposed a PEFC equipped with a membrane electrode assembly (MEA) with electrodes including a catalyst layer joined on both sides of an electrolyte membrane, (for example, Patent Document 2). Pd and Pt as a catalyst component of the Pd/Pt particles contained in the catalyst layer of the PEFC are derived from a halide.

Thus, the method of manufacturing the Pd/Pt particles described in Patent Document 2 employs a halogen-free compound for an ion-exchange liquid used in preparing Pd and Pt. Patent Document 2 discloses that the use of halogen should be avoided because halogen ion degrades battery performance. Patent Document 2 discloses warm water cleaning as a method for deionization treatment with respect to halogen.

Then, there is disclosed a method for preparation of a powder of platinum (Pt) or platinum (Pt) alloy that contains less than 100 ppm of chlorine as the catalyst component of the electrode catalyst (for example, Patent Document 3).

As for the preparation of a powder of the platinum (Pt) or platinum (Pt) alloy, there is disclosed the following method: forming a melt which contains a low-melting mixture of alkali-metal nitrate, a chlorine-free platinum compound and a chlorine-free compound of alloying elements; heating the melt up to a reaction temperature at which the platinum compound and the compound of the alloying elements are thermally decomposed to give an oxide; cooling the melt; and the melt is dissolved in water and the resulting oxide or mixed oxides are converted into a powder of platinum or platinum alloy by successive reduction.

Whereas, it becomes important in the future development of PEFC, to pursue reduction of cost in a variety of ways, while maintaining or improving power generation performance toward the practical use thereof.

For this reason, study from the same point of view becomes so important in the development of electrode catalyst as well that there has been conducted the study of an electrode catalyst having a so-called core-shell structure (core-shell catalyst) (for example, Patent Document 4, Patent Document 5).

In manufacturing processes of such core-shell catalyst, a metal chloride salt is often used as a raw material.

For example, Patent Document 4 and Patent Document 5 disclose a core-shell catalyst employing palladium as a constituent element of a core part and platinum as a constituent element of a shell part, showing, as one example of a raw material for such shell part, potassium chloroplatinate.

For such core-shell catalyst employing palladium as a constituent element of the core part, and platinum as a constituent element of the shell part, there are often employed, as a raw material, materials containing chloride (Cl) species such as platinum (Pt) chloride salt, palladium (Pd) chloride salt. This is presumably due to the fact that the chloride salts of platinum (Pt) and palladium (Pd) are easily available, and easy to use under their manufacturing conditions, resulting in comparatively low cost of raw materials. For this reason, it is difficult to respond to the need to let the core-shell catalyst exhibit sufficient catalytic activity, by positively choosing, as a starting material, a compound containing no halogen elements (particularly chlorine).

Meanwhile, the present applicant submits, as publications where the above-mentioned publicly-known inventions are described, the following publications:

PRIOR ART DOCUMENT

Patent Documents

Patent Document 1: Japanese Un-examined Patent Application Publication No. 2009-238560 (Japanese patent No. 5358997)

Patent Document 2: Japanese Un-examined Patent Application Publication No. 2008-293737 (Japanese patent No. 5169025)

Patent document 3: Japanese Un-examined Patent Application Publication No. 2003-129102 (Japanese patent No. 4286499)

Patent document 4: Japanese Unexamined Patent Application Publication (Translation of PCT Application) No. 2011-526655

Patent document 5: Japanese Unexamined Patent Application Publication No. 2013-215701

Non-Patent Document

Non-Patent Document 1: MATSUOKA et al., "Degradation of Polymer Electrolyte Fuel Cells under the Existence of Anion Species", J. Power Sources, 2008 May 1, Vol. 179 No. 2, P. 560-565

SUMMARY OF THE INVENTION

Problem to be Solved by the Invention

In view of the above technical background, particularly for an electrode catalyst having a so-called core-shell structure, it is imperative to study a process for manufacturing an electrode catalyst that can reliably and sufficiently reduce the content of chlorine (Cl) species while using chloride salts of metal such as platinum (Pt) and palladium (Pd) as a raw material (Pt).

However, there have heretofore been no sufficient studies conducted on such process for manufacturing an electrode catalyst having a core-shell structure which can reliably and sufficiently reduce the content of chlorine (Cl) species through a relatively simple method, and hence there has been room for improvement.

For example, Patent Document 1 discloses that a halogen element causes degradation of battery performance when it remains in an electrode. However, Patent Document 1 only refers to warm water cleaning or the like as a method for removal of such halogen element, and no specific measures are described therein.

Further, Patent Document 2 merely discloses a case where a halide is used as a raw material of an electrode catalyst, and no particular dehalogenation treatment (washing) is performed, or a case where no halogen compound is used as a raw material of an electrode catalyst, and yet, acid, water washing is performed. Furthermore, there has been such a disadvantage that you have to employ the method for producing an electrode catalyst involving such a complex process for removal of chlorine as disclosed in Patent Document 3, etc. in order to produce an electrode catalyst containing powders of platinum (Pt), etc. that contain less than 100 ppm of chlorine.

The present invention has been made in view of the above-mentioned technical context, and it is an object of the present invention to provide a production method of an electrode catalyst that can reduce the content of chlorine species reliably and sufficiently through a relatively simple operation, even when using an electrode catalyst precursor containing a relatively high concentration of chlorine (Cl) species as a raw material of the electrode catalyst.

It is another object of the present invention to provide an electrode catalyst obtained by the aforesaid electrode catalyst production method, a gas diffusion electrode forming composition, a gas diffusion electrode, a membrane-electrode assembly (MEA), and a fuel cell stack including such electrode catalyst.

The present inventors, as a result of having performed intensively studies, came up with the following findings on an electrode catalyst having a core-shell structure, and have completed the present invention.

That is, the present inventors found out that it is possible to reduce the chlorine (Cl) species content of the resultant electrode catalyst reliably and sufficiently, and have completed the present invention by subjecting a liquid containing ultrapure water and an electrode catalyst precursor exhibiting a relatively high chlorine (Cl) species concentration (e.g., concentrations not lower than 2,600 ppm, or even 3000 ppm) when measured by X-ray fluorescence (XRF) spectroscopy, to filtrating and washing treatment under certain conditions. More specifically, the present invention comprises the following technical matters:

That is, the present invention provides (1) a production method of an electrode catalyst having a core-shell structure including a support, a core part formed on the support and a shell part formed to cover at least a part of a surface of the core part, comprising:

a first step (1) of retaining a liquid containing ultrapure water, a reductant and an electrode catalyst precursor under at least one stage of a temperature predetermined within a range of 10 to 95° C. for a predetermined retention time, the electrode catalyst precursor being produced using a material containing chlorine (Cl) species, and exhibiting a chlorine (Cl) species concentration not lower than a predetermined first chlorine (Cl) species concentration when measured by X-ray fluorescence (XRF) spectroscopy;

a second step (2) of preparing a first liquid with the catalyst precursor contained in the liquid obtained after the first step being dispersed in ultrapure water, by adding ultrapure water to the liquid obtained after the first step;

a third step (3) of preparing a second liquid by filtrating and washing the catalyst precursor contained in the first liquid with ultrapure water, and then repeatedly performing washing until an electric conductivity ρ of a filtrate obtained after washing has become not higher than a first predetermined value when measured by a JIS-standard testing method (JIS K0552), such that dispersed in ultrapure water is the electrode catalyst precursor contained in said liquid exhibiting an electric conductivity ρ not higher than said first predetermined value; and a fourth step (4) of drying the second liquid.

According to the production method of the present invention, there is performed a relatively simple operation of adding an easily available and easy-to-use reductant to the liquid obtained by dispersing the electrode catalyst precursor in ultrapure water. Thus, the electrode catalyst as a product can have its chlorine species content reduced reliably and sufficiently.

Further, according to the present invention, since the chlorine (Cl) species content can be reliably and sufficiently reduced, a decrease in the electrode catalyst obtained which is incurred by the chlorine (Cl) species can be sufficiently and easily prevented. Also, the production method of the present invention is suitable for mass production of the electrode catalyst, and is suitable for reducing the manufacturing cost.

Here, in the present invention, the chlorine (Cl) species refers to a chemical species containing chlorine as a constituent element. Specifically, examples of chemical species containing chlorine include chlorine atom (Cl), chlorine molecule ($Cl_2$), chloride ion ($Cl^-$), chlorine radical (Cl.), polyatomic chlorine ion and chloride compound (e.g. X—Cl, X as counterion).

Further, in the present invention, the chlorine (Cl) species concentration is measured by X-ray fluorescence (XRF) spectroscopy. A valued obtained by measuring the chlorine (Cl) species contained in the electrode catalyst is the concentration of the chlorine (Cl) species.

Particularly, the chlorine (Cl) species concentration is the concentration of chlorine atoms in terms of the chlorine element contained in the electrode catalyst.

Further, the present invention provides (2) a production method of an electrode catalyst having a core-shell structure including a support, a core part formed on the support and a shell part formed to cover at least a part of a surface of the core part, comprising:

a first step' (1') of retaining a liquid containing ultrapure water, a hydrogen-containing gas and an electrode catalyst precursor under at least one stage of a temperature predetermined within a range of 10 to 60° C. for a predetermined retention time, the electrode catalyst precursor being produced using a material containing chlorine (Cl) species, and exhibiting a chlorine (Cl) species concentration not lower than a predetermined first chlorine (Cl) species concentration when measured by X-ray fluorescence (XRF) spectroscopy.

According to the production method of the present invention, there is performed a relatively simple operation of dissolving a hydrogen-containing gas as an easily available and easy-to-use reductant in the liquid obtained by dispersing the electrode catalyst precursor in ultrapure water. Thus, the electrode catalyst can have its chlorine (Cl) species content reduced reliably and sufficiently.

Furthermore, the present invention provides (3) the production method of the electrode catalyst according to (1) or (2), wherein the first chlorine (Cl) species concentration is 6,000 ppm. Such value of the first chlorine (Cl) species concentration is supported by the results of the comparative examples that are described later. Based on the results of the working examples described later, the first chlorine (Cl) species concentration may be a number from a range of greater than 2,600 ppm. For example, the first chlorine (Cl) species concentration may be 3,000 ppm.

Here, from the perspective of more reliably achieving the effects of the present invention, it is preferred that the reductant used in the present invention be a substance that is easily obtainable and easy to use. In this respect, it is more preferred that the reductant be a substance that can be easily dispersed or easily dissolved in the liquid obtained by dispersing the electrode catalyst precursor in ultrapure water. In addition, it is particularly preferred that the reductant be a substance that can be obtained with a relatively inexpensive price. From the viewpoints described above, it is preferred that the reductant used in the present invention be the substance(s) as set forth in the following (4) to (7).

Furthermore, the present invention provides (4) the production method of the electrode catalyst according to (1), wherein the reductant is at least one kind of compound selected from an organic acid and an organic acid salt.

Furthermore, the present invention provides (5) the production method of the electrode catalyst according to (1), wherein the reductant is at least one kind of compound selected from the group consisting of formic acid, sodium formate, oxalic acid and sodium oxalate.

Furthermore, the present invention provides (6) the production method of the electrode catalyst according to (1), wherein the reductant is at least one kind of compound selected from an inorganic acid and an inorganic acid salt.

Furthermore, the present invention provides (7) the production method of the electrode catalyst according to (1), wherein the reductant is at least one kind of compound selected from the group consisting of carbonic acid, sodium carbonate, thiosulfuric acid, sodium thiosulfate and hydrogen sulfide.

Furthermore, the present invention provides (8) the production method of the electrode catalyst according to any one of (1) to (7), further comprising a fifth step (5) of drying the dispersion liquid obtained after the first step or the first step'.

The inventors of the present invention found that the chlorine (Cl) species contained in the electrode catalyst precursor could be more reliably reduced, by once drying the dispersion liquid obtained after the first step (or the dispersion liquid obtained after the first step') in the fifth step, and then again dispersing the same in ultrapure water in the second step later (so-called reslurrying).

The inventors of the present invention believe that in the first step or the first step' (and even the second and third steps thereafter), there are portions of the electrode catalyst precursor powder that will not be fully washed (e.g. a part of the pore surfaces of the powder with which ultrapure water cannot come into contact) even when dispersed and retained in ultrapure water (or when being filtrated and washed by such ultrapure water later).

Moreover, the inventors of the present invention believe that in the fifth step, by once drying the dispersion liquid obtained after the first step (or the dispersion liquid obtained after the first step'), and then by again dispersing the electrode catalyst precursor powder thus obtained in ultrapure water, the ultrapure water is able to newly come into contact with and wash at least a part of the portions of the powder with which the ultrapure water had failed to come into contact with in the previous steps.

Furthermore, the present invention provides (9) the production method of the electrode catalyst according to (2), further comprising:

a second step (2) of preparing a first liquid with the electrode catalyst precursor contained in the liquid obtained after the first step' being dispersed in ultrapure water, by adding ultrapure water to the liquid obtained after the first step';

a third step (3) of preparing a second liquid by filtrating and washing the electrode catalyst precursor contained in the first liquid with ultrapure water, and then repeatedly performing washing until an electric conductivity ρ of a filtrate obtained after washing has become not higher than a first predetermined value when measured by a JIS-standard testing method (JIS K0552), such that dispersed in ultrapure water is the electrode catalyst precursor contained in the liquid exhibiting an electric conductivity ρ not higher than said first predetermined value; and a fourth step (4) of drying the second liquid.

Furthermore, the present invention provides

(10) the production method of the electrode catalyst according to (1) or (9), wherein the first predetermined value is a value selected from a range of not higher than 100 μS/cm.

Furthermore, the present invention provides

(11) the production method of the electrode catalyst according to any one of (1) to (10), wherein the electrode catalyst precursor used in the first step or the first step' is subjected to a pretreatment process comprising:

a step (P1) of preparing a P1 liquid with an electrode catalyst precursor being dispersed in ultrapure water by adding the electrode catalyst precursor (PI) to the ultrapure water, the electrode catalyst precursor being produced using a material containing chlorine (Cl) species, and exhibiting a chlorine (Cl) species concentration not lower than a predetermined second chlorine (Cl) species concentration when measured by X-ray fluorescence (XRF) spectroscopy;

a step (P2) of preparing a P2 liquid by dispersing an electrode catalyst precursor in ultrapure water, the electrode catalyst precursor being obtained by filtrating and washing the electrode catalyst precursor contained in the P1 liquid with ultrapure water, and then repeatedly performing washing until an electric conductivity ρ of a filtrate obtained after washing has become not higher than a predetermined value of the step P1 when measured by the JIS-standard testing method (JIS K0552); and a step (P3) of drying the P2 liquid.

In this way, the inventors of the present invention found that the chlorine (Cl) species contained in the electrode catalyst precursor could be more reliably reduced by once drying the dispersion liquid obtained after the step P2 in the step P3, and then again dispersing the same in ultrapure water in the first step (or first step') (so-called reslurrying).

That is, there can be achieved the same effects as those achievable by performing reslurrying as described in the case where the first step (or the first step') is carried out via the fifth step.

Furthermore, the present invention provides

(12) the production method of the electrode catalyst according to (11), wherein the second chlorine (Cl) species concentration is 6,000 ppm.

Furthermore, the present invention provides

(13) the production method of the electrode catalyst according to (11), wherein the predetermined value of the step P1 is a value selected from the range of not higher than 100 μS/cm.

Furthermore, the present invention provides

(14) the production method of the electrode catalyst according to any one of (1) to (13), wherein the shell part contains at least one metal selected from platinum (Pt) and a platinum (Pt) alloy, and the core part contains at least one metal selected from the group consisting of palladium (Pd), a palladium (Pd) alloy, a platinum (Pt) alloy, gold (Au), nickel (Ni) and a nickel (Ni) alloy.

Furthermore, the present invention provides

(15) the production method of the electrode catalyst according to (14), wherein a platinum (Pt) chloride is used as a raw material of a metal constituting the shell part.

Furthermore, the present invention provides

(16) the production method of the electrode catalyst according to any one of (1) to (15), wherein the shell part has:

a first shell part formed to cover at least a part of the surface of the core part; and a second shell part formed to cover at least a part of a surface of the first shell part.

Furthermore, the present invention provides the production method of the electrode catalyst according to (16), wherein a platinum (Pt) chloride is used as a raw material of a metal constituting the second shell part.

Furthermore, the present invention provides (18) an electrode catalyst produced by the production method of the electrode catalyst according to any one of (1) to (17).

Furthermore, the present invention provides

(19) a composition for forming a gas diffusion electrode, containing the electrode catalyst produced by the production method of the electrode catalyst according to any one of (1) to (17).

Furthermore, the present invention provides

(20) a gas diffusion electrode containing the electrode catalyst produced by the production method of the electrode catalyst according to any one of (1) to (17).

Furthermore, the present invention provides

(21) a membrane-electrode assembly (MEA) including the gas diffusion electrode as set forth in (20).

Furthermore, the present invention provides

(22) a fuel cell stack including the membrane-electrode assembly (MEA) as set forth in (21).

Effects of the Invention

According to the production method of the electrode catalyst of the present invention, there can be obtained, through relatively simple operations, an electrode catalyst whose chlorine (Cl) species content has been reliably and sufficiently reduced, even when using as an electrode catalyst material an electrode catalyst precursor containing a chlorine (Cl) species of a relatively high concentration (e.g. a concentration greater than 2,600 ppm, a concentration not lower than 3,000 ppm, or even a concentration no lower than 6,000 ppm).

Further, according to the present invention, since the chlorine (Cl) species content can be reliably and sufficiently reduced, a decrease in the catalytic activity of the electrode catalyst obtained which is incurred by the chlorine (Cl) species can be easily and sufficiently prevented.

Furthermore, according to the present invention, there can be provided a production method of an electrode catalyst that is suitable for mass production and reducing the manufacturing cost(s).

Furthermore, according to the present invention, there can be provided an electrode catalyst produced by the above-mentioned production method of the electrode catalyst and exhibiting a sufficiently reduced chlorine (Cl) species concentration; a composition for forming a gas diffusion electrode that contains such electrode catalyst; a gas diffusion electrode containing such electrode catalyst; a membrane-electrode assembly (MEA) containing such electrode catalyst; and a fuel cell stack containing such electrode catalyst.

MODE FOR CARRYING OUT THE INVENTION

Hereinafter, with reference to the accompanying drawings, there will be described preferred embodiments of the present invention in detail. First, a production method of an electrode catalyst of the present invention will be described, and then an electrode catalyst or the like obtained by such production method of the electrode catalyst will be described.

<Production Method of Electrode Catalyst>

A production method of an electrode catalyst of the present invention includes:

a first step (1) of retaining a liquid containing ultrapure water, a reductant and an electrode catalyst precursor under at least one stage of a temperature predetermined within a range of 10 to 95° C. for a predetermined retention time, the electrode catalyst precursor being produced using a material containing chlorine (Cl) species, and exhibiting a chlorine (Cl) species concentration not lower than a predetermined first chlorine (Cl) species concentration when measured by X-ray fluorescence (XRF) spectroscopy;

a second step (2) of preparing a first liquid with the catalyst precursor contained in the liquid obtained after the first step being dispersed in ultrapure water, by adding ultrapure water to the liquid obtained after the first step;

a third step (3) of preparing a second liquid by filtrating and washing the catalyst precursor contained in the first liquid with ultrapure water, and then repeatedly performing washing until an electric conductivity ρ of a filtrate obtained after washing has become not higher than a first predetermined value when measured by a JIS-standard testing method (JIS K0552), such that dispersed in ultrapure water is the electrode catalyst precursor contained in said liquid exhibiting an electric conductivity ρ not higher than said first predetermined value; and a fourth step (4) of drying the second liquid.

Further, the production method of the electrode catalyst of the present invention includes first step' (1') of retaining a liquid containing ultrapure water, a hydrogen-containing gas and an electrode catalyst precursor under at least one stage of a temperature predetermined within a range of 10 to 60° C. (preferably, one stage of a temperature predetermined within a range of 20 to 40° C.) for a predetermined retention time, the electrode catalyst precursor being produced using a material containing chlorine (Cl) species, and exhibiting a chlorine (Cl) species concentration not lower than a predetermined first chlorine (Cl) species concentration when measured by X-ray fluorescence (XRF) spectroscopy.

Figure 1:
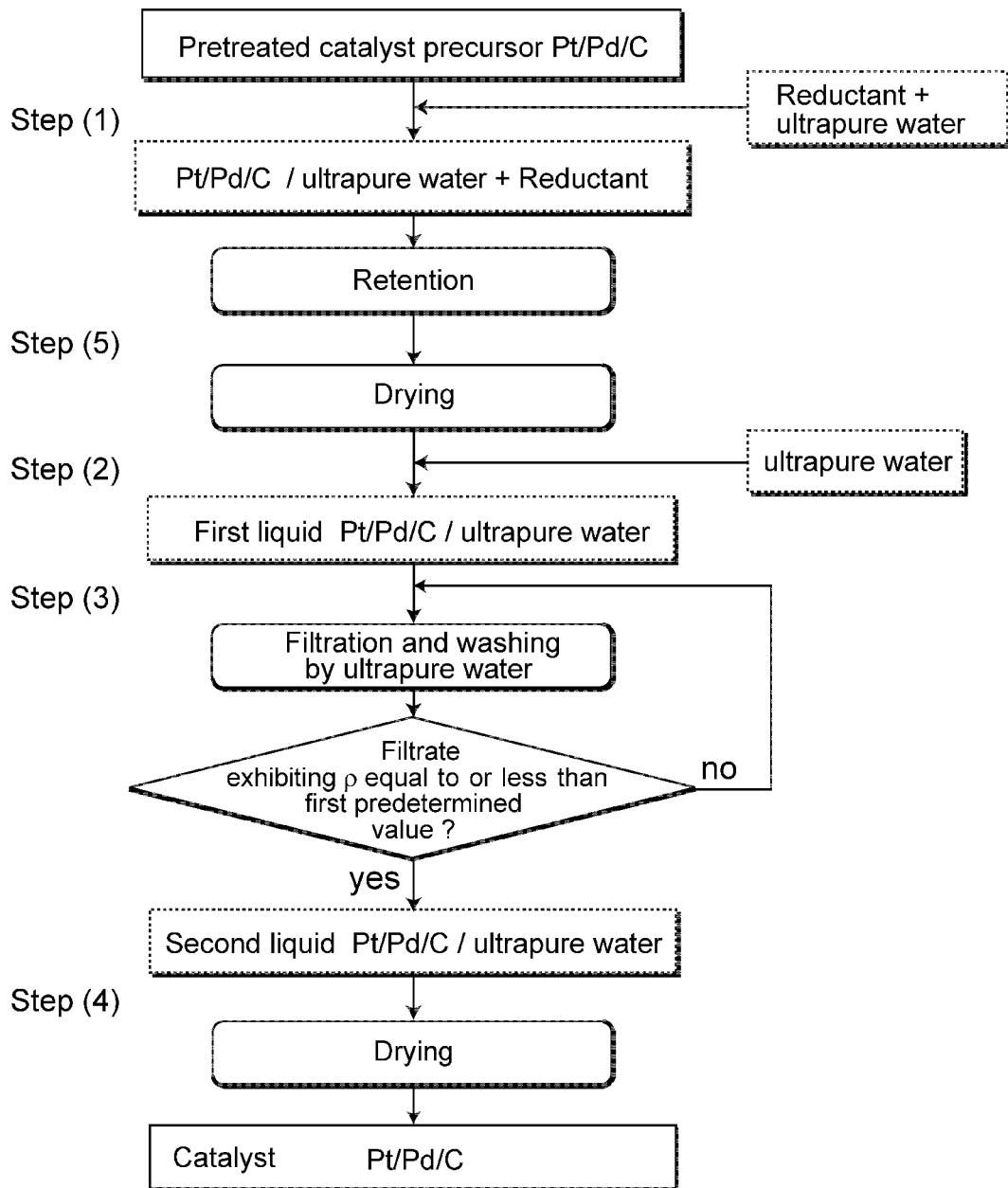
FIG. 1 is a flow chart showing a preferred embodiment of a first step of a production method of an electrode catalyst of the present invention.

FIG. 1 is a flow chart showing each operation of a preferred embodiment of a production process of the production method of the electrode catalyst, including the first step to the fourth step. Each of the steps is described hereunder.

(First Step and Such)

The production method of the electrode catalyst of the present invention includes the first step. FIG. 1 is a flow chart showing each operation of a preferred embodiment of the first step. As shown in FIG. 1, the first step is to retain a liquid containing ultrapure water, a reductant and an electrode catalyst precursor under a temperature predetermined within a range of 10 to 95° C. (preferably a predetermined temperature within a range of 20 to 90° C.) for a predetermined retention time, the electrode catalyst precursor exhibiting a first chlorine (Cl) species concentration not lower than a predetermined value (e.g. 6,000 ppm, 3,000 ppm) when measured by X-ray fluorescence (XRF) spectroscopy.

With regard to the first step, a step using a hydrogen-containing gas as a reductant is defined as the first step'.

Figure 2:
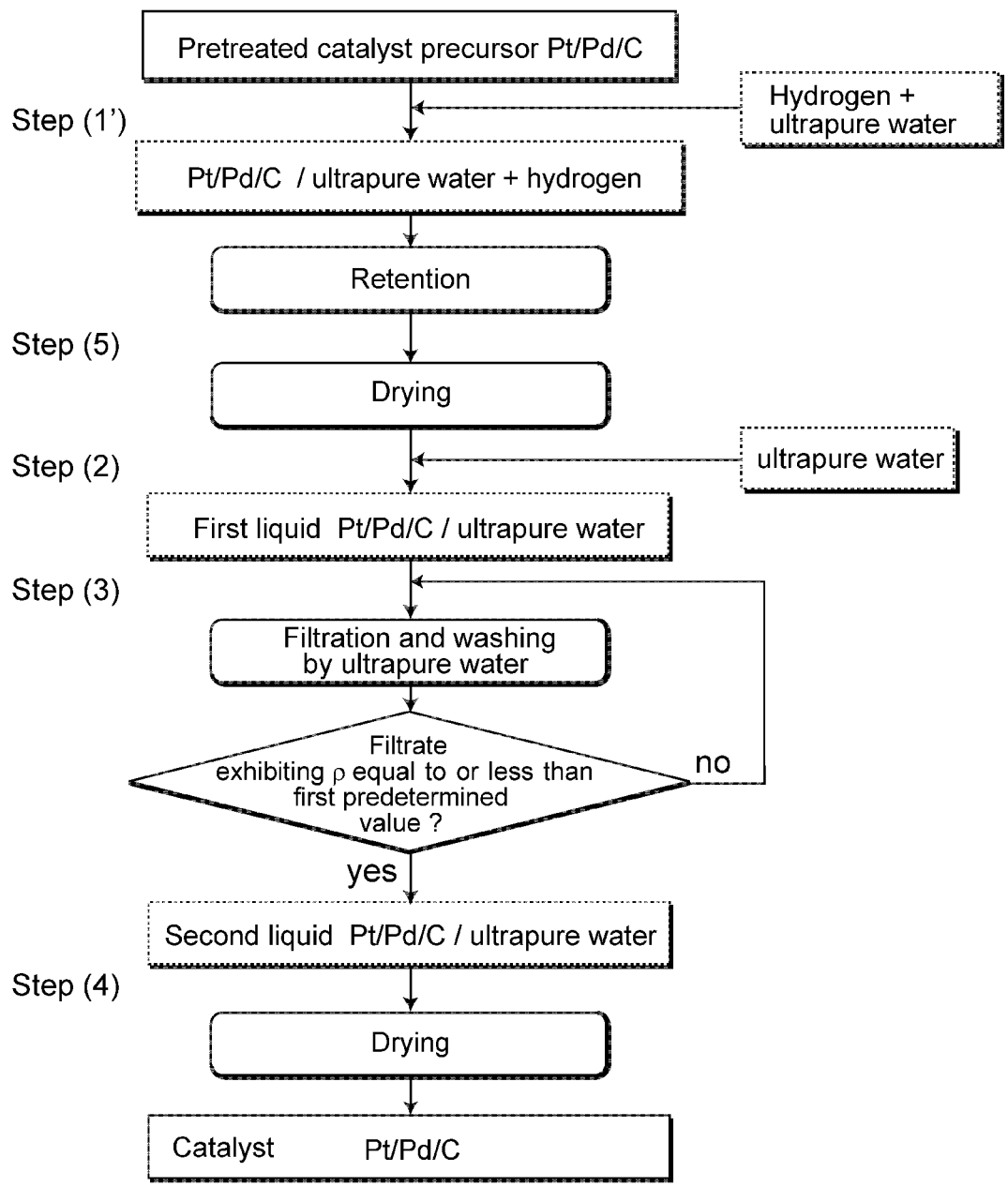
FIG. 2 is a flow chart showing a preferred embodiment of a first step' of the production method of the electrode catalyst of the present invention.

FIG. 2 is a flow chart showing each operation of a preferred embodiment of the first step'. As shown in FIG. 2, the first step' is to retain a liquid containing ultrapure water, a hydrogen-containing gas and an electrode catalyst precursor under at least one stage of a temperature predetermined within a range of 10 to 60° C. (preferably at least one stage of a temperature predetermined within a range of 20 to 40° C.) for a predetermined retention time, the electrode catalyst precursor exhibiting a chlorine (Cl) species concentration not lower than a predetermined first chlorine (Cl) species concentration when measured by X-ray fluorescence (XRF) spectroscopy. In the first step', there is prepared a liquid containing ultrapure water, a hydrogen-containing gas and a particular electrode catalyst precursor.

Here, in the following description, the step is referred to as "first step and such" unless particular distinction is made between the first step and the first step'.

[Ultrapure Water]

The "ultrapure water" used in the first step of the production method of the electrode catalyst of the present invention is a type of water exhibiting a specific resistance R of not lower than 3.0 MΩ·cm, such specific resistance R being represented by the following general formula (1) (i.e. an inverse number of the electric conductivity measured by the JIS-standard testing method (JIS K0552)). Further, it is preferred that the "ultrapure water" have a water quality equivalent to or clearer than "A3" as defined in JISK 0557 "Water used for industrial water and wastewater analysis."

There are no particular restrictions on the abovementioned ultrapure water, as long as the water has an electric conductivity that satisfies the relationship represented by the general formula (1). Examples of such ultrapure water include ultrapure water produced using ultrapure water system from "Milli-Q series" (by Merck Ltd.); and ultrapure water produced using ultrapure water system from "Elix UV series" (by Nihon Millipore K.K). Here, it is preferred that such ultrapure water be used in the first step, because impurities such as chlorine (Cl) species will thus not be contained in the electrode catalyst.

$$R = 1/\rho \tag{1}$$

In the above general formula (1), R represents the specific resistance, and ρ represents the electric conductivity measured by the JIS-standard testing method (JIS K0552).

[Reductant]

The reductant used in the first step has a function of eliminating chlorine (Cl) species or the like in the production process of the electrode catalyst, by reacting with chlorine (Cl) species or the like that is derived from the catalyst components as raw materials and from a treatment liquid. Preferable examples of such reductant include an organic acid, an organic acid salt, an inorganic acid and an inorganic acid salt. Particularly, the reductant used in the first step' is a hydrogen-containing gas.

Examples of an organic acid or an organic acid salt include formaldehyde, formic acid, sodium formate, oxalic acid, sodium oxalate, ascorbic acid and sodium ascorbate. Preferable examples of an inorganic acid or an inorganic acid salt include carbonic acid, sodium carbonate, thiosulfuric acid, sodium thiosulfate, hydrogen sulfide, sodium borohydride, dimethylamine borane, hydrazine, hypophosphorous acid and sodium hypophosphite

[Electrode Catalyst Precursor]

The electrode catalyst precursor (I) used in the first step satisfies the condition where the chlorine (Cl) species concentration measured by X-ray fluorescence (XRF) spectroscopy is not lower than a predetermined first chlorine (Cl) species concentration (e.g. first chlorine (Cl) species concentration of 6,000 ppm, or even 3,000 ppm). The chlorine (Cl) species contained in the electrode catalyst precursor (I) is derived from a catalyst component(s) as the raw material of the electrode catalyst and a treatment liquid(s).

As for an electrode catalyst obtained by a conventional production method of electrode catalyst, unless subjected to the elimination of the chlorine (Cl) species, the chlorine (Cl) species concentration measured by X-ray fluorescence (XRF) spectroscopy is typically a relatively high concentration which is not lower than the first chlorine (Cl) species concentration (e.g. first chlorine (Cl) species concentration of 6,000 ppm, or even 3,000 ppm). According to the studies conducted by the inventors of the present invention, the electrode catalyst (as the electrode catalyst precursor in the present invention) obtained by the conventional production method of electrode catalyst using a material containing chlorine (Cl) species, exhibited a chlorine (Cl) species concentration not lower than 6,000 ppm when measured by the abovementioned spectroscopy (see results of comparative examples below).

In the first step and such, the predetermined first chlorine (Cl) species concentration can be appropriately changed and determined depending on the quality of the electrode catalyst precursor used. Specifically, focus is placed on the chlorine (Cl) species concentration of the electrode catalyst produced using a material(s) containing chlorine (Cl) species. It is preferred that the predetermined first chlorine (Cl) species concentration be that allowing the electrode catalyst to fully exhibit its catalytic performance, and being within a range suitable for the production process of an electrode catalyst.

That is, the electrode catalyst precursor used in the first step (I) is equivalent to the electrode catalyst obtained by the conventionally employed production method of electrode catalyst.

The electrode catalyst 1 is produced by having the support 2 support the catalyst components (core part 4, shell part 5) of the electrode catalyst.

There are no particular restrictions on a production method of the electrode catalyst precursor as long as the method allows the catalyst components of the electrode catalyst 1 to be supported on the support 2.

Examples of the production method of the electrode catalyst precursor include an impregnation method where a solution containing the catalyst components of the electrode catalyst 1 is brought into contact with the support 2 to impregnate the support 2 with the catalyst components; a liquid phase reduction method where a reductant is put into a solution containing the catalyst components of the electrode catalyst 1; an electrochemical deposition method such as under-potential deposition (UPD); a chemical reduction method; a reductive deposition method using adsorption hydrogen; a surface leaching method of alloy catalyst; immersion plating; a displacement plating method; a sputtering method; and a vacuum evaporation method.

(Pretreatment Process)

In the production method of the electrode catalyst of the present invention, as such electrode catalyst precursor used in the first step or the like, there may also be used a type of electrode catalyst precursor obtained through a "pretreatment process" including the following steps (P1) to (P3).

Figure 3:
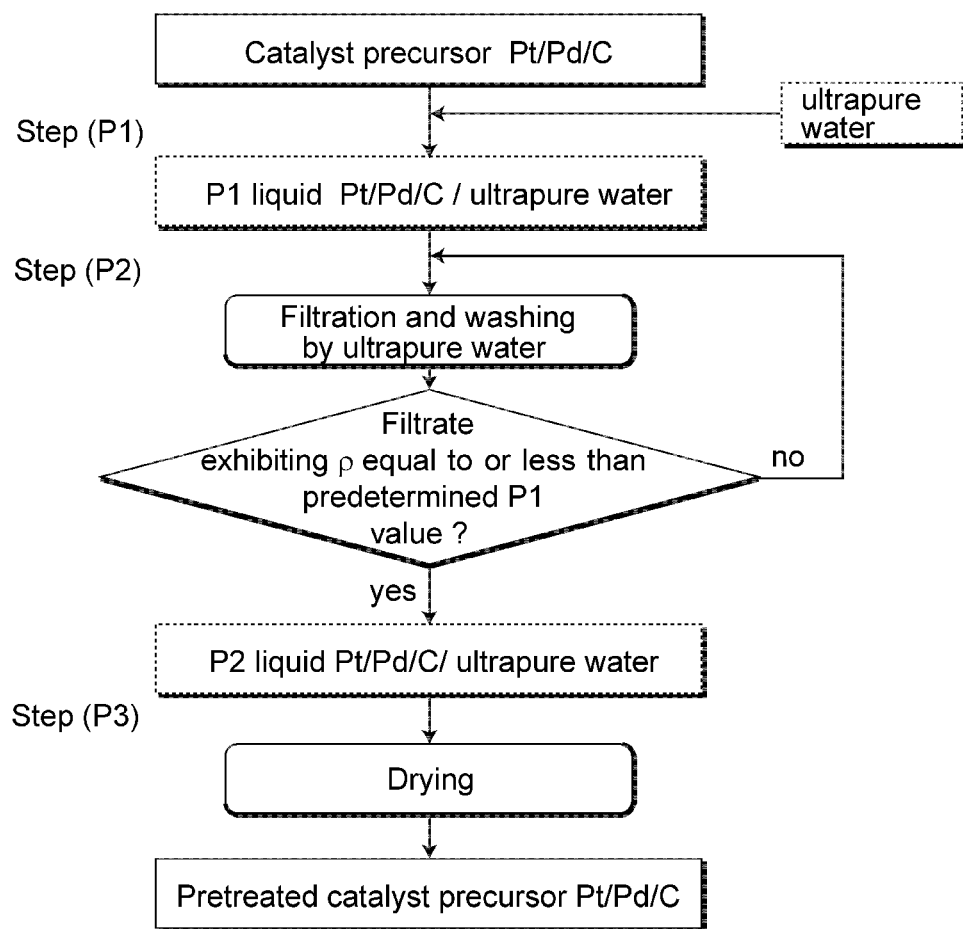
FIG. 3 is a flow chart showing a preferred embodiment of a pretreatment process of the production method of the electrode catalyst of the present invention.

FIG. 3 is a flow chart showing each operation of a preferred embodiment of the pretreatment process.

As shown in FIG. 3, the pretreatment process includes a step (P1), a step (P2) and a step (P3). The step (P1) is to prepare a P1 liquid with an electrode catalyst precursor (PI) being dispersed in ultrapure water. The P1 liquid is prepared by adding such electrode catalyst precursor to the ultrapure water. Here, the electrode catalyst precursor is produced using a material containing chlorine (Cl) species, and exhibits a relatively high chlorine (Cl) species concentration which is not lower than a predetermined second chlorine (Cl) species concentration (e.g. a second chlorine (Cl) species concentration of a predetermined value greater than 6,000 ppm, or 3,000 ppm, or even 2,600 ppm) when measured by X-ray fluorescence (XRF) spectroscopy.

The step (P2) is to prepare a P2 liquid by dispersing an electrode catalyst precursor (PII) in the ultrapure water. Specifically, the electrode catalyst precursor is obtained as follows. That is, the electrode catalyst precursor contained in the P1 liquid is washed using the ultrapure water, followed by repeatedly washing the same until a filtrate obtained after washing has exhibited an electric conductivity ρ that is not higher than a predetermined P1 value when measured by the JIS-standard testing method (JIS K0552), thus obtaining the electrode catalyst precursor.

The step (P3) is to dry the P2 liquid.

The filtration and washing method used in the step P2 is similar to that used in the third step described below. It is preferred that the predetermined P1 value in the step P2 be that selected from the rang of not higher than 100 μS/cm, or even from the range of not higher than 10 μS/cm. Further, a drying method used in the step P3 is similar to a later-described drying method used in the fourth step.

In this way, the dispersion liquid obtained after the step P2 is once dried in the step P3, followed by once again dispersing the same in ultrapure water in the first step (or first step') (so-called reslurrying), thereby making it possible to more reliably reduce the chlorine (Cl) species contained in the electrode catalyst precursor.

Figure 4:
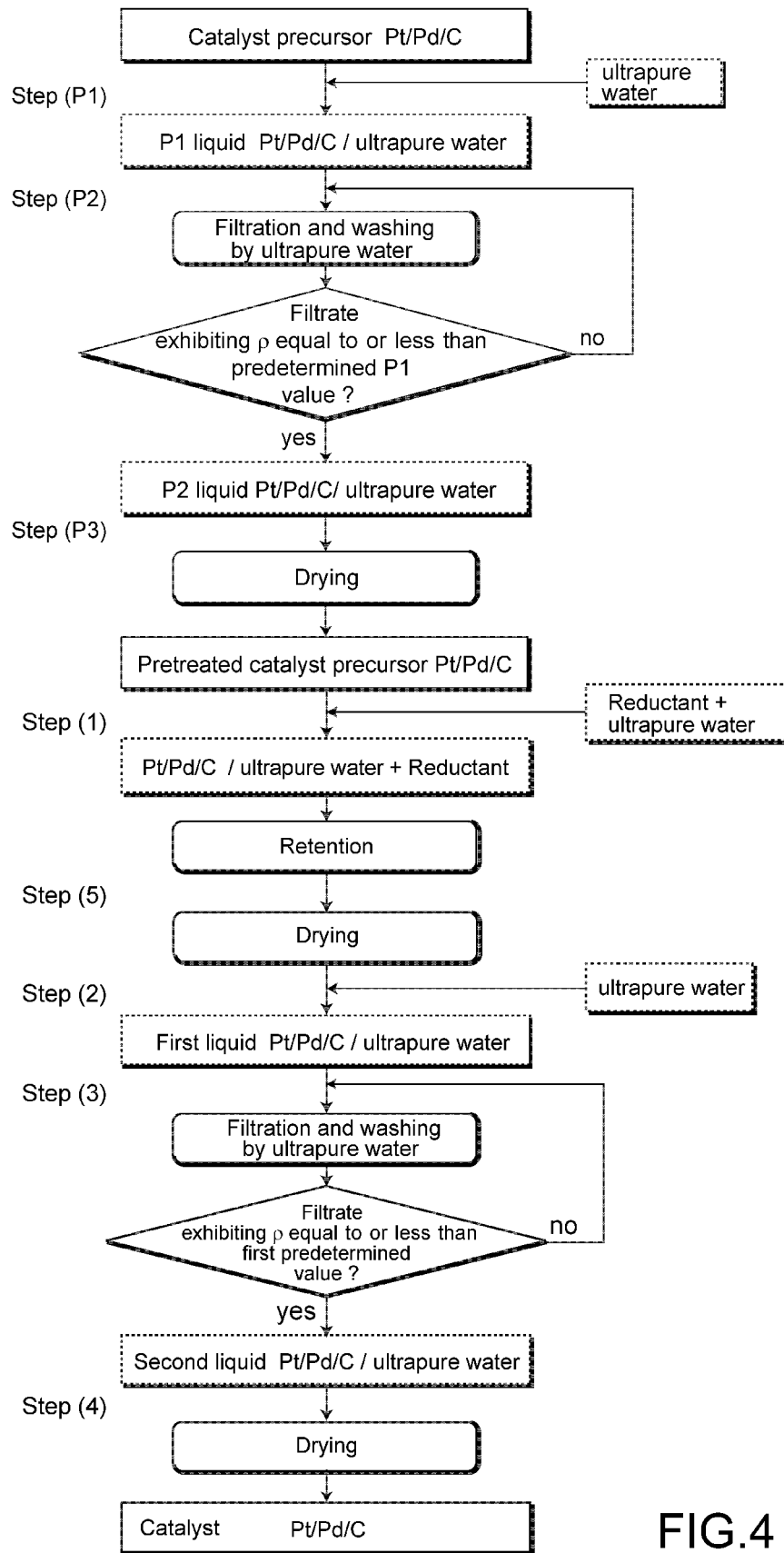
FIG. 4 is a flow chart showing a preferred embodiment of each step of the production method of the electrode catalyst of the present invention, the production method including the pretreatment process and the first step.

FIG. 4 is a flow chart showing each operation of the production method of the electrode catalyst which includes a pretreatment process before the first step.

Figure 5:
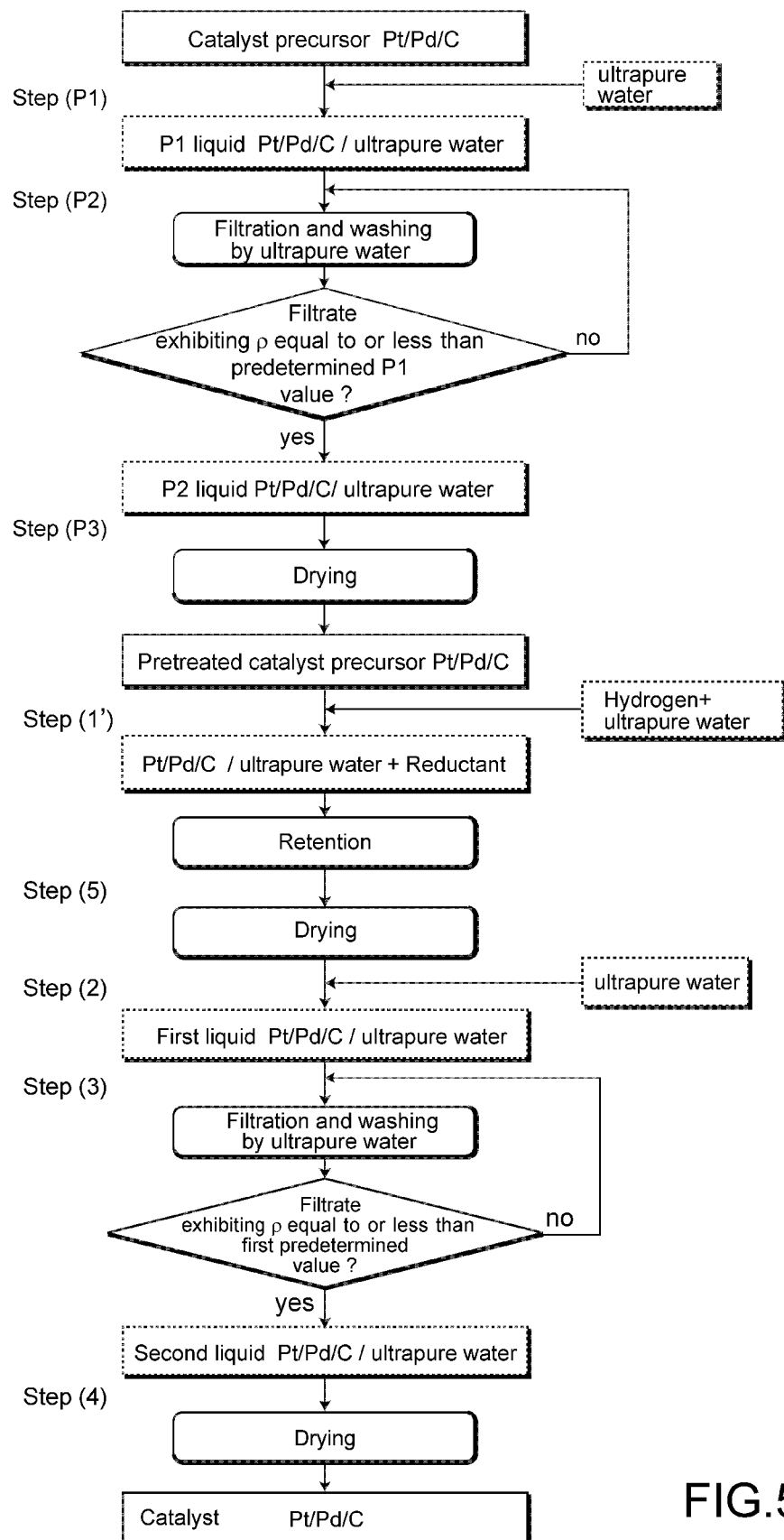
FIG. 5 is a flow chart showing a preferred embodiment of each step of the production method of the electrode catalyst of the present invention, the production method including the pretreatment process and the first step'.

Further, FIG. 5 is a flow chart showing each operation of the production method of the electrode catalyst which includes a pretreatment process before the first step'.

As shown in FIG. 4 and FIG. 5, by subjecting the raw material(s) of the electrode catalyst precursor to the pretreatment process, the chlorine (Cl) species contained in the raw material(s) of the electrode catalyst precursor can be eliminated. Further, an electrode catalyst precursor whose chlorine (Cl) species concentration has been reduced is defined as the electrode catalyst precursor in the first step and such. This type of electrode catalyst precursor is subjected to the first step and such. In the first step and such, each operation is carried out with the electrode catalyst precursor obtained through the steps (P1) to (P3) being used as a starting material. Thus, as for the production method of the electrode catalyst of the present invention, the pretreatment process is established before the first step and such, so that the chlorine (Cl) species concentration contained in the electrode catalyst precursor can be further reduced.

In the pretreatment process, the predetermined second chlorine (Cl) species concentration is typically set to be higher than the predetermined first chlorine (Cl) species concentration set in the first step and such.

The first chlorine (Cl) species concentration and the second chlorine (Cl) species concentration are previously determined in accordance with the concentration of the chlorine (Cl) species contained in the electrode catalyst precursor and with the production process.

[Retention Temperature and Such]

The first step is to retain a liquid containing ultrapure water, a reductant and an electrode catalyst precursor under a temperature predetermined within a range of 10 to 95° C. (preferably a temperature predetermined within a range of 20 to 90° C.), the electrode catalyst precursor exhibiting a relatively high chlorine (Cl) species concentration that is not lower than the first chlorine (Cl) species concentration (e.g. a first chlorine (Cl) species concentration of a predetermined value greater than 6,000 ppm, or 3,000 ppm, or even 2,600 ppm) when measured by X-ray fluorescence (XRF) spectroscopy. Although, there are no particular restrictions on the retention temperature as long as such retention temperature is within the range of 10 to 95° C., preferably 20 to 90° C., the retention temperature is appropriately determined based on, for example, the concentration of the chlorine (Cl) species contained in the electrode catalyst precursor and the kind of a reductant.

In the first step', it is preferred that the retention temperature be at least one stage of a temperature predetermined within the range of 10 to 60° C., if the reductant used is a hydrogen-containing gas. It is more preferred that the retention temperature be at least one stage of a temperature predetermined within the range of 20 to 40° C.

The retention temperature has at least one stage of a predetermined temperature. There are no particular restrictions on the retention time so long as the retention time is that allowing the reductant and the electrode catalyst precursor to fully react with each other.

By retaining the liquid that is obtained by mixing together ultrapure water, a reductant and the electrode catalyst precursor under the abovementioned retention temperature and for the abovementioned retention time, the chlorine (Cl) species contained in the electrode catalyst precursor is eliminated. In this way, the chlorine (Cl) species concentration of the electrode catalyst precursor, as measured by X-ray fluorescence (XRF) spectroscopy, will decrease significantly. Finally, the chlorine (Cl) species concentration will be easily reduced to a concentration that is lower than the first chlorine (Cl) species concentration. For example, the chlorine (Cl) species concentration can be easily reduced to a concentration that is lower than 6,000 ppm, a concentration that is lower than 3,000 ppm, or a concentration that is not higher than 2,000 ppm, or even a concentration level of 0 to 1,000 ppm, thereby allowing the aforementioned electrode catalyst precursor to become the electrode catalyst of the present invention.

According to the production method of the electrode catalyst of the present invention, by including the first step, there can be obtained an electrode catalyst whose chlorine (Cl) species concentration has been easily reduced to a concentration that is lower than 6,000 ppm, a concentration that is lower than 3,000 ppm, or a concentration that is not higher than 2,000 ppm, or even a concentration level of 0 to 1,000 ppm, even when employing as a raw material an electrode catalyst precursor exhibiting a relatively high chlorine (Cl) species concentration that is not lower than the first chlorine (Cl) species concentration (e.g. a first chlorine (Cl) species concentration of 6,000 ppm) when measured by X-ray fluorescence (XRF) spectroscopy.

(Fifth Step)

In addition, the production method of the electrode catalyst of the present invention may further include a fifth step of drying the liquid obtained after the first step and such. The dispersion liquid obtained after the first step and such (or the dispersion liquid obtained after the first step') is once dried in the fifth step, followed by once again dispersing the same in ultrapure water (so-called reslurrying), thus making it possible to more reliably obtain an electrode catalyst whose chlorine (Cl) species concentration has been significantly reduced.

Although the mechanism thereof remains to be fully elucidated, the inventors of the present invention believe that in the first step and such (and even the second and third steps thereafter), there are portions of the electrode catalyst precursor powder that will not be fully washed (e.g. the kind of pore surfaces of the powder with which ultrapure water cannot come into contact) even when dispersed in ultrapure water (or when being filtrated and washed by such ultrapure water).

Moreover, the inventors of the present invention believe that in the fifth step, by once drying the dispersion liquid obtained after the first step and such, and then by again dispersing the electrode catalyst precursor powder thus obtained in ultrapure water (i.e. reslurrying), the ultrapure water is able to newly come into contact with and wash at least a part of the portions of the powder with which the ultrapure water had failed to come into contact with in the previous steps.

There are no particular restrictions on the conditions for drying the liquid obtained after the first step and such so long as the conditions include a drying temperature and a drying time by which there can be obtained the electrode catalyst precursor contained in the liquid prepared after the first step and such. For example, the drying temperature may be 20 to 90° C., and the drying time may be 0.5 to 24 hours.

(Second Step)

The production method of the electrode catalyst of the present invention includes the second step. The second step is to prepare the first liquid by adding ultrapure water to the liquid obtained after the first step and such, such that dispersed in the ultrapure water is the electrode catalyst precursor contained in the liquid obtained after the first step and such. The second step is a step of preparing the first liquid with the electrode catalyst obtained in the first step and such being regarded as an electrode catalyst precursor.

Further, the second step may also treat the liquid obtained through the first step' where a hydrogen-containing gas is used as the reductant.

(Third Step)

The production method of the electrode catalyst of the present invention includes the third step. The third step is to filtrate and wash the electrode catalyst precursor contained in the first liquid that is prepared in the second step, and repeatedly perform washing until the electric conductivity $\rho$ of the filtrate obtained after washing has become not higher than the first predetermined value. The third step is to reduce the concentration of the chlorine (Cl) species contained in the electrode catalyst precursor, by washing the electrode catalyst precursor.

The electric conductivity ρ of the filtrate obtained after washing is measured by the JIS-standard testing method (JIS K0552). In the third step, the electrode catalyst precursor contained in the first liquid is filtrated and washed, followed by measuring the electric conductivity ρ of a filtrate obtained after washing, and then repeatedly performing washing until such electric conductivity ρ has become not higher than the first predetermined value. As for the third step, by previously determining the first predetermined value, the concentration of the chlorine (Cl) species contained in the electrode catalyst precursor can be finely controlled.

The first predetermined value can be appropriately determined in accordance with the concentration of the chlorine (Cl) species contained in the electrode catalyst. It is preferred that the first predetermined value be a value selected from a range of not higher than 100 μS/cm. It is preferred that the first predetermined value be not higher than 100 μS/cm, because the concentration of the chlorine (Cl) species contained in the electrode catalyst precursor can thus be easily reduced to a concentration that is lower than 6,000 ppm, or a concentration that is not higher than 3,000 ppm, or even a concentration level of 0 to 1,000 ppm. Moreover, it is preferred that the first predetermined value be a value selected from a range not higher than 10 μS/cm.

Here, if the first step undergoes the pretreatment process, the first predetermined value is typically set to be either not higher than or lower than the predetermined P1 value in the pretreatment process.

However, due to the abovementioned reslurry effect, when the amount of the chlorine (Cl) species to be eliminated through washing is increased, and the chlorine (Cl) species concentration becomes large in the first step (and the second step) rather than in the pretreatment process, the first predetermined value may be set to be higher than the predetermined P1 value in certain cases.

In the third step, washing of the first liquid is completed when there has been achieved a value not higher than the first predetermined value as a result of filtrating and washing the electrode catalyst precursor contained in the first liquid that is prepared in the second step. The first liquid is then defined as the second liquid when there has been achieved a value not higher than the first predetermined value.

Here, there are no particular restrictions on a filtration and washing method employed in the third step so long as the method does not impair the core-shell structure of the electrode catalyst of the present invention. As such filtration method, there may be performed, for example, a natural filtration or a filtration under a reduced pressure, using a paper filter or a membrane filter.

(Fourth Step)

The production method of the electrode catalyst of the present invention includes the fourth step. The fourth step is a step of drying the second liquid prepared in the third step. There are no particular restrictions on the conditions for drying the second liquid so long as the conditions include a drying temperature and a drying time by which there can be obtained the electrode catalyst precursor contained in the second liquid. For example, the drying temperature may be 20 to 90° C., and the drying time may be 0.5 to 24 hours.

Further, there may also be included a step after the fourth step, where the core-shell catalyst is to be dispersed in an aqueous solution obtained by adding an acid(s) to ultrapure water, and a solution thus prepared is then retained under at least one stage of a temperature predetermined within a range of 10 to 95° C. (preferably at least one stage of a temperature predetermined within a range of 20 to 90° C.) for a predetermined retention time. Examples of such acid include sulfuric acid, nitric acid, hydrochloric acid and acetic acid.

According to the production method of the electrode catalyst of the present invention, it is possible to reduce the chlorine (Cl) species contained in the electrode catalyst precursor. The electrode catalyst obtained by the production method of the electrode catalyst of the present invention contains the chlorine (Cl) species exhibiting a concentration of 0 to 2,000 ppm as measured by X-ray fluorescence (XRF) spectroscopy.

Since the electrode catalyst obtained by the production method of the electrode catalyst of the present invention, can easily reduce the concentration of the chlorine (Cl) species, as measured by X-ray fluorescence (XRF) spectroscopy, not only to a concentration of less than 6,000 ppm, preferably to a concentration of not higher than 3,000 ppm, more preferably to a concentration of not higher than 2,000 ppm, or even more preferably to a concentration level of 0 to 1,000 ppm. For this reason, the electrode catalyst obtained can sufficiently prevent a decrease in the catalytic activity thereof due to the chlorine (Cl) species, and thus also improve the catalytic activity thereof.

<Electrode Catalyst>

Figure 6:
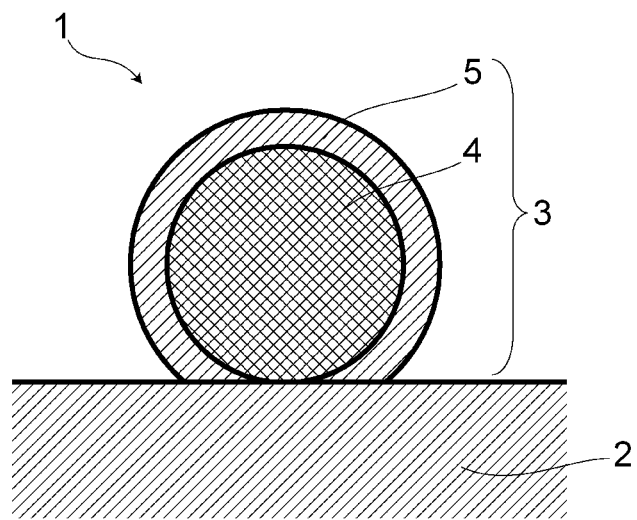
FIG. 6 is a schematic cross-sectional view showing a preferred embodiment of the electrode catalyst of the present invention (core-shell catalyst).

FIG. 6 is a schematic cross-sectional view showing a preferable embodiment of an electrode catalyst 1 (core-shell catalyst) obtained by the electrode catalyst production method of the present invention.

As shown in FIG. 6, an electrode catalyst 1 obtained by the electrode catalyst production method of the present invention includes a support 2; and catalyst particles 3 supported on the support 2 and having a so-called "core-shell structure." Each catalyst particle 3 has a core part 4; and a shell part 5 covering at least a part of the surface of the core part 4. The catalyst particles 3 thus have a so-called "core-shell structure" including the core part 4 and the shell part 5 formed on the core part 4.

That is, the electrode catalyst 1 has the catalyst particles 3 supported on the support 2, and the catalyst particles 3 have the structure where the core part 4 serves as a core (core portion), and the shell part 5 as a shell covers the surface of the core part 4.

Further, the constituent element (chemical composition) of the core part 4 and the constituent element (chemical composition) of the shell part 5 differ from each other in composition.

There are no particular restrictions on the electrode catalyst 1 of the present invention except that the shell part 5 has to be formed on at least a part of the surface of the core part 4 of each catalyst particle 3.

For example, in terms of more reliably achieving the effects of the present invention, it is preferred that the electrode catalyst 1 be in a state where the whole range of the surface of the core part 4 is substantially covered by the shell part 5, as shown in FIG. 6.

Further, the electrode catalyst 1 may also be in a state where a part of the surface of the core part 4 is covered by the shell part 5, and the rest part of the surface of the core part 4 is thus partially exposed, provided that the effects of the present invention can be achieved.

That is, with regard to the electrode catalyst of the present invention, it is sufficient that the shell part be formed on at least a part of the surface of the core part.

Figure 7:
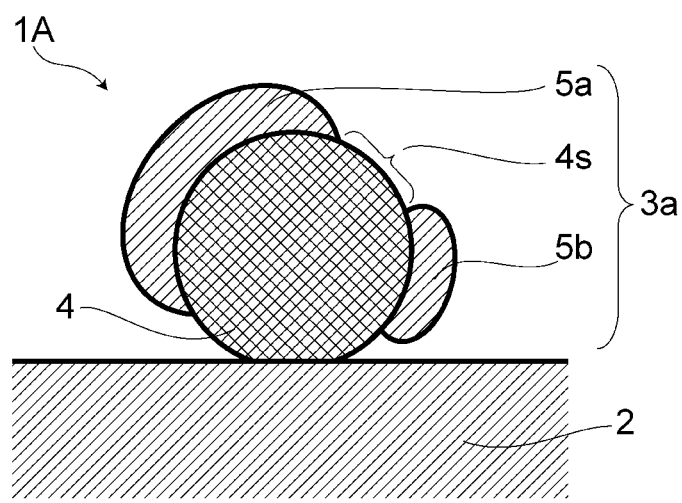
FIG. 7 is a schematic cross-sectional view showing another preferred embodiment of the electrode catalyst of the present invention (core-shell catalyst).

FIG. 7 is a schematic cross-sectional view showing another preferable embodiment (electrode catalyst 1A) of the electrode catalyst (core-shell catalyst) of the present invention.

As shown in FIG. 7, an electrode catalyst 1A of the present invention has catalyst particles 3a each being composed of a core part 4; a shell part 5a covering a part of the surface of the core part 4; and a shell part 5b covering an other part of the surface of the core part 4.

With regard to the catalyst particles 3a contained in the electrode catalyst 1A shown in FIG. 7, there is a part of the core part 4 that is neither covered by the shell part 5a nor covered by the shell part 5b. This part of the core part 4 composes a core part-exposed surface 4s.

That is, as shown in FIG. 7, the catalyst particles 3a contained in the electrode catalyst 1A may also be in a state where the surface of the core part 4 is partially exposed (e.g. a state where 4s as a part of the surface of the core part 4 shown in FIG. 7 is exposed).

In other words, as is the case with the electrode catalyst 1A shown in FIG. 7, the shell part 5a may be partially formed on a part of the surface of the core part 4, and the shell part 5b may then be partially formed on an other part of the surface of the core part 4.

Figure 8:
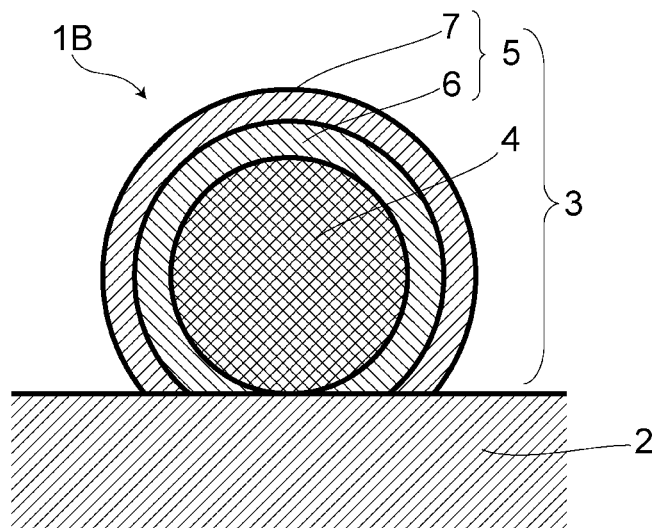
FIG. 8 is a schematic cross-sectional view showing another preferred embodiment of the electrode catalyst of the present invention (core-shell catalyst).

FIG. 8 is a schematic cross-sectional view showing an other preferable embodiment (electrode catalyst 1B) of the electrode catalyst (core-shell catalyst) of the present invention.

As shown in FIG. 8, an electrode catalyst 1B of the present invention has catalyst particles 3 each being composed of a core part 4; and a shell part 5 substantially covering the whole range of the surface of the core part 4.

The shell part 5 may have a two-layered structure composed of a first shell part 6 and a second shell part 7. That is, the catalyst particles 3 have a so-called "core-shell structure" comprised of the core part 4; and the shell part 5 (first shell part 6 and second shell part 7) formed on the core part 4.

The electrode catalyst 1B has a structure where the catalyst particles 3 are supported on the support 2; the core part 4 of each catalyst particle 3 serves as a core (core portion); and the whole range of the surface of the core part 4 is substantially covered by the shell part 5 composed of the first shell part 6 and the second shell part 7. Here, the constituent element (chemical composition) of the core part 4, the constituent element (chemical composition) of the first shell part 6 and the constituent element (chemical composition) of the second shell part 7 differ from one another in composition.

Moreover, the shell part 5 included in the electrode catalyst 1B of the present invention may further include an other shell part in addition to the first shell part 6 and the second shell part 7.

In terms of more reliably achieving the effects of the present invention, it is preferred that the electrode catalyst 1B be in a state where the whole range of the surface of the core part 4 is substantially covered by the shell part 5, as shown in FIG. 8.

Figure 9:
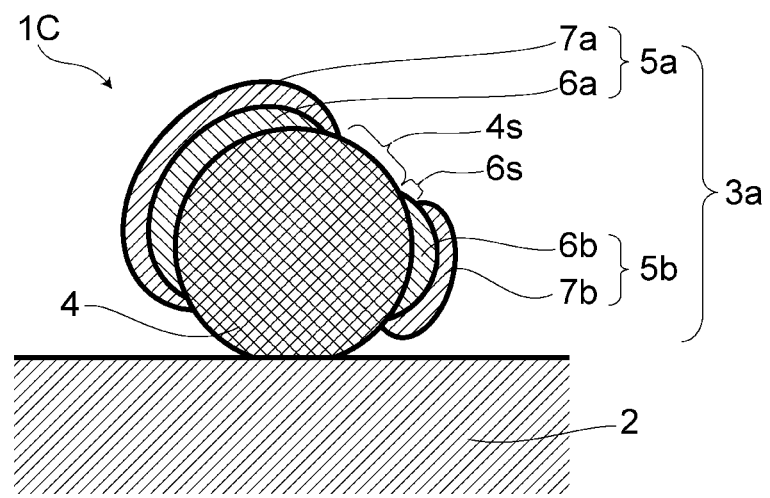
FIG. 9 is a schematic cross-sectional view showing another preferred embodiment of the electrode catalyst of the present invention (core-shell catalyst).

FIG. 9 is a schematic cross-sectional view showing an other preferable embodiment (electrode catalyst 1C) of the electrode catalyst (core-shell catalyst) of the present invention.

As shown in FIG. 9, an electrode catalyst 1C of the present invention has catalyst particles 3a each being composed of a core part 4; a shell part 5a covering a part of the surface of the core part 4; and a shell part 5b covering an other part of the surface of the core part 4.

The shell part 5a may have a two-layered structure composed of a first shell part 6a and a second shell part 7a.

Further, the shell part 5b may have a two-layered structure composed of a first shell part 6b and a second shell part 7b.

That is, the catalyst particles 3a have a so-called "core-shell structure" comprised of the core part 4; the shell part 5a (first shell part 6a and second shell part 7a) formed on the core part 4; and the shell part 5b (first shell part 6b and second shell part 7b) formed on the core part 4.

With regard to the shell part 5b composing the catalyst particle 3a shown in FIG. 9, there is a part of the first shell part 6b that is not covered by the second shell part 7b. The part of the first shell part 6b that is not covered by the second shell part 7b composes a first shell part-exposed surface 6s.

With regard to the shell part 5a composing the catalyst particle 3 shown in FIG. 9, it is preferred that the whole range of the first shell part 6a be substantially covered by the second shell part 7a.

Further, as shown in FIG. 9 and with regard to the shell part 5b composing each catalyst particle 3a, also permissible is a state where a part of the surface of the first shell part 6b is covered, and the surface of the first shell part 6b is thus partially exposed (e.g. a state shown in FIG. 9 where the part 6s of the surface of the first shell part 6b is exposed), provided that the effects of the present invention can be achieved.

Moreover, on the premise that the effects of the present invention can be achieved, the electrode catalyst 1 may allow a "complex of the core part 4 and shell part 5 with the whole range of the surface of the core part 4 being substantially covered by the shell part 5" and a "complex of the core part 4 and shell part 5 with the surface of the core part 4 being partially covered by the shell part 5" to coexist on the support 2 in a mixed manner.

Specifically, the electrode catalyst of the present invention may be in a state where the electrode catalysts 1 and 1A shown in FIGS. 6 and 7 and the electrode catalysts 1B and 1C shown in FIGS. 8 and 9 coexist in a mixed manner, provided the effects of the present invention can be achieved.

Further, the electrode catalyst of the present invention may allow the shell part 5a and the shell part 5b to coexist in a mixed manner with respect to an identical core part 4, as shown in FIG. 9, provided that the effects of the present invention can be achieved.

Furthermore, on the premise that the effects of the present invention can be achieved, the electrode catalyst of the present invention may allow only the shell part 5a to exist with respect to an identical core part 4 or only the shell part 5b to exist with respect to an identical core part 4 (none of these states are shown in the drawings).

Furthermore, on the premise that the effects of the present invention can be achieved, the electrode catalyst 1 may also be in a state where "particles only comprised of the core parts 4 that are not covered by the shell parts 5" are supported on the support 2, in addition to at least one kind of the electrode catalysts 1, 1A, 1B and 1C (not shown).

Furthermore, on the premise that the effects of the present invention can be achieved, the electrode catalyst 1 may also be in a state where "particles only composed of the constituent element of the shell part 5" are supported on the support 2 without being in contact with the core parts 4, in addition to at least one kind of the electrode catalysts 1, 1A, 1B and 1C (not shown).

Furthermore, on the premise that the effects of the present invention can be achieved, the electrode catalyst 1 may also be in a state where "particles only comprised of the core parts 4 that are not covered by the shell parts 5" and "particles only composed of the constituent element of the shell part 5" are individually and independently supported on the support 2, in addition to at least one kind of the electrode catalysts 1, 1A, 1B and 1C.

It is preferred that the core part 4 have an average particle diameter of 2 to 40 nm, more preferably 4 to 20 nm, particularly preferably 5 to 15 nm.

As for the thickness of the shell part 5 (thickness from the surface in contact with the core part 4 to the outer surface of the shell part 5), a preferable range thereof is to be appropriately determined based on the design concept(s) of the electrode catalyst.

For example, when the amount of the metal element (e.g. platinum) used to compose the shell part 5 is intended to be minimized. When there is only one kind of metal element composing the shell part 5, it is preferred that the thickness of the shell part 5 be twice as large as the diameter of one atom of such metal element (in spherical approximation). Further, when there are not fewer than two kinds of metal elements composing the shell part 5, it is preferred that the thickness of the shell part 5 be that of a layer of one atom (one atomic layer formed with two or more kinds of atoms being apposed on the surface of the core part 4).

Further, for example, when attempting to improve a durability by employing a shell part 5 of a larger thickness, it is preferred that such thickness be 1 to 10 nm, more preferably 2 to 5 nm.

When the shell part 5 has the two-layered structure composed of the first shell part 6 and the second shell part 7, preferable ranges of the thicknesses of the first shell part 6 and second shell part 7 are appropriately determined based on the design concept(s) of the electrode catalyst of the present invention.

For example, when the amount of a noble metal such as platinum (Pt) as a metal element contained in the second shell part 7 is intended to be minimized, it is preferred that the second shell part 7 be a layer composed of one atom (one atomic layer). In this case, when there is only one kind of metal element composing the second shell part 7, it is preferred that the thickness of the second shell part 7 be approximately twice as large as the diameter of one atom of such metal element (provided that an atom is considered as a sphere).

Further, when there are not fewer than two kinds of metal elements contained in the second shell part 7, it is preferred that the second shell part 7 have a thickness equivalent to that of a layer composed of not fewer than one kind of atom (one atomic layer formed with two or more kinds of atoms being apposed in the surface direction of the core part 4). For example, when attempting to improve the durability of the electrode catalyst by employing a second shell part 7 of a larger thickness, it is preferred that the thickness of the second shell part 7 be 1.0 to 5.0 nm. If the durability of the electrode catalyst is to be further improved, it is preferred that the thickness of the second shell part 7 be 2.0 to 10.0 nm.

Here, in the present invention, "average particle diameter" refers to an average value of the diameters of an arbitrary number of particles as particle groups that are observed through electron micrographs.

There are no particular restrictions on the support 2, as long as such support 2 is capable of supporting the catalyst particles 3 as the complexes composed of the core parts 4 and the shell parts 5 serving as catalyst components of the electrode catalyst 1, and has a large surface area. Moreover, it is preferred that the support 2 be that exhibiting a favorable dispersibility and a superior electrical conductivity in a composition used to form a gas diffusion electrode having the electrode catalyst 1.

The support 2 may be appropriately selected from carbon-based materials such as glassy carbon (GC), fine carbon, carbon black, black lead, carbon fiber, activated carbon, ground product of activated carbon, carbon nanofiber and carbon nanotube; and glass-based or ceramic-based materials such as oxides.

Among these materials, carbon-based materials are preferred in terms of their adsorptivities with respect to the core part 4 and in terms of a BET specific surface area of the support 2.

Further, as a carbon-based material, an electrically conductive carbon is preferred. Particularly, an electrically conductive carbon black is preferred as an electrically conductive carbon. Examples of such electrically conductive carbon black include products by the names of "Ketjenblack EC300 J," "Ketjenblack EC600" and "Carbon EPC" (produced by Lion Corporation).

There are no particular restrictions on the component of the core part 4, as long as the component is capable of being covered by the shell part 5.

When the shell part 5 employs a one-layered structure as are the cases with the electrode catalysts 1 and 1A that are shown in FIGS. 6 and 7 instead of the two-layered structure, the core part 4 may also employ a noble metal(s). The core part 4 composing the catalyst particles 3 and 3a of the electrode catalysts 1 and 1A, contains at least one metal selected from the group consisting of palladium (Pd), a palladium (Pd) alloy, a platinum (Pt) alloy, gold (Au), nickel (Ni) and a nickel (Ni) alloy.

There are no particular restrictions on a palladium (Pd) alloy, as long as the alloy is to be obtained by combining palladium (Pd) with an other metal capable of forming an alloy when combined with palladium (Pd). For example, such palladium (Pd) alloy may be a two-component palladium (Pd) alloy obtained by combining palladium (Pd) with an other metal; or a three or more-component palladium (Pd) alloy obtained by combining palladium (Pd) with not fewer than two kinds of other metals. Specifically, examples of such two-component palladium (Pd) alloy include gold palladium (PdAu), silver palladium (PdAg) and copper palladium (PdCu). One example of a three-component palladium (Pd) alloy is gold-silver-palladium (PdAuAg).

There are no particular restrictions on a platinum (Pt) alloy, as long as the alloy is to be obtained by combining platinum (Pt) with an other metal capable of forming an alloy when combined with platinum (Pt). For example, such platinum (Pt) alloy may be a two-component platinum (Pt) alloy obtained by combining platinum (Pt) with an other metal; or a three or more-component platinum (Pt) alloy obtained by combining platinum (Pt) with not fewer than two kinds of other metals. Specifically, examples of such two-component platinum (Pt) alloy include nickel platinum (PtNi) and cobalt platinum (PtCo).

There are no particular restrictions on a nickel (Ni) alloy, as long as the alloy is to be obtained by combining nickel (Ni) with an other metal capable of forming an alloy when combined with nickel (Ni). For example, such nickel (Ni) alloy may be a two-component nickel (Ni) alloy obtained by combining nickel (Ni) with an other metal; or a three or more-component nickel (Ni) alloy obtained by combining nickel (Ni) with not fewer than two kinds of other metals. Specifically, one example of such two-component nickel (Ni) alloy is tungsten nickel (NiW).

The shell part 5 contains at least one kind of metal selected from platinum (Pt) and a platinum (Pt) alloy. There are no particular restrictions on a platinum (Pt) alloy, as long as the alloy is to be obtained by combining platinum (Pt) with an other metal capable of forming an alloy when combined with platinum (Pt). For example, such platinum (Pt) alloy may be a two-component platinum (Pt) alloy obtained by combining platinum (Pt) with an other metal; or a three or more-component platinum (Pt) alloy obtained by combining platinum (Pt) with not fewer than two kinds of other metals. Specifically, examples of such two-component platinum (Pt) alloy include nickel platinum (PtNi), cobalt platinum (PtCo), platinum ruthenium (PtRu), platinum molybdenum (PtMo) and platinum titanium (PtTi). Particularly, in order for the shell part 5 to have a poisoning resistance, a platinum ruthenium (PtRu) alloy may be used.

As are the cases with the electrode catalysts 1B and 1C that are shown in FIGS. 8 and 9, when the shell part 5 employs the two-layered structure composed of the first shell part 6 and the second shell part 7, a metal element(s) other than noble metals may be the main component especially from the perspective of reducing the cost for producing the electrode catalyst 1. Specifically, it is preferred that the core part 4 be composed of a metal element(s) other than platinum (Pt) and palladium (Pd), a metal compound of such metal and/or a mixture of such metal and such metal compound. It is more preferred that the core part 4 be composed of a metal element(s) other noble metals, a metal compound of such metal and/or mixture of such metal and such metal compound.

A supported amount of the platinum (Pt) contained in the shell part 5 is 5 to 20% bymass, preferably 8 to 16% by mass with respect to the weight of the electrode catalyst 1. It is preferred that the amount of the platinum (Pt) supported be not smaller than 5% by mass, because the electrode catalyst can fully exert its catalytic activity in such case. It is also preferred that the amount of the platinum (Pt) supported be not larger than 20% by mass in terms of production cost.

In the case where the shell part 5 has the two-layered structure composed of the first shell part 6 and the second shell part 7, it is preferred that the first shell part 6 contain at least one kind of metal selected from the group consisting of palladium (Pd), a palladium (Pd) alloy, a platinum (Pt) alloy, gold (Au), nickel (Ni) and a nickel (Ni) alloy, and it is more preferred that the first shell part 6 contain palladium (Pd) simple substance.

From the perspective of further improving the catalytic activities of the electrode catalysts 1B and 1C and more easily obtaining the same, it is preferred that the first shell part 6 be mainly composed of palladium (Pd) simple substance (not less than 50 wt %), and it is more preferred that such first shell part 6 be only composed of palladium (Pd) simple substance.

It is preferred that the second shell part 7 contain at least one kind of metal selected from platinum (Pt) and a platinum (Pt) alloy, and it is more preferred that such shell part 7 contain platinum (Pt) simple substance.

From the perspective of further improving the catalytic activities of the electrode catalysts 1B and 1C and more easily obtaining the same, it is preferred that the second shell part 7 be mainly composed of platinum (Pt) simple substance (not less than 50 wt %), and it is more preferred that such second shell part 7 be only composed of platinum (Pt) simple substance.

(Concentration of Chlorine (Cl) Species)

The electrode catalyst, obtained by the electrode catalyst production method of the present invention, exhibits a chlorine (Cl) species concentration of not higher than 6,000 ppm when measured through X-ray fluorescence (XRF) spectroscopy. The electrode catalyst obtained by the electrode catalyst production method of the present invention has a technical feature of reducing the chlorine (Cl) species concentration by undergoing at least a first step (1) and a second step (2) of the production method of the electrode catalyst, even when employing an electrode catalyst precursor exhibiting a chlorine (Cl) species concentration of not lower than 6,000 ppm when measured through X-ray fluorescence (XRF) spectroscopy.

According to the production method of the electrode catalyst of the present invention, when using, as the raw material, an electrode catalyst precursor exhibiting a chlorine (Cl) species concentration of not lower than 6,000 ppm when measured by X-ray fluorescence (XRF) spectroscopy, there can be more easily provided than before an electrode catalyst whose chlorine (Cl) species concentration has been reduced not only to a concentration of not higher than 3,000 ppm, but also to a concentration level of not higher than 2000 ppm, or even to 0 to 1000 ppm.

The chlorine (Cl) species concentration is measured through X-ray fluorescence (XRF) spectroscopy. A value obtained by measuring the b chlorine (Cl) species contained in the electrode catalyst through X-ray fluorescence (XRF) spectroscopy is the chlorine (Cl) species concentration. Here, the chlorine (Cl) species concentration is the concentrations of the chlorine atoms in terms of the chlorine element contained in the electrode catalyst.

X-ray fluorescence (XRF) spectroscopy is a method where a specimen containing a particular element A is irradiated with a primary X-ray to generate a fluorescent X-ray of such element A, followed by measuring the intensity of such fluorescent X-ray of the element A such that quantitative analysis of the captioned element A contained in the specimen can be performed. When performing quantitative analysis through X-ray fluorescence (XRF) spectroscopy, there may be employed the fundamental parameter method (FP method) used in theoretical operation. The FP method applies the idea that if the compositions and kinds of the elements contained in a specimen are all known, the fluorescent X-ray (XRF) intensities thereof can be individually and theoretically calculated. In addition, the FP method allows there to be estimated a composition(s) corresponding to the fluorescent X-ray (XRF) of each element that is obtained by measuring the specimen.

X-ray fluorescence (XRF) spectroscopy is performed using general fluorescent X-ray (XRF) analyzers such as an energy dispersive fluorescent X-ray (XRF) analyzer, a scanning-type fluorescent X-ray (XRF) analyzer and a multi-element simultaneous-type fluorescent X-ray (XRF) analyzer. A fluorescent X-ray (XRF) analyzer is equipped with a software which makes it possible to process the experimental data regarding the correlation between the intensity of the fluorescent X-ray (XRF) of the element A and the concentration of the element A. There are no particular restrictions on such software, as long as the software is that generally used to perform X-ray fluorescence (XRF) spectroscopy. For example, there may be employed a software for use in a general fluorescent X-ray (XRF) analyzer adopting the FP method, such as an analysis software: "UniQuant 5." Here, one example of the abovementioned fluorescent X-ray (XRF) analyzer is a full-automatic wavelength dispersive fluorescent X-ray analyzer (product name: Axios by Spectris Co., Ltd.)

As for the electrode catalyst obtained by the production method of the electrode catalyst of the present invention, the concentration of the chlorine (Cl) species, as measured by X-ray fluorescence (XRF) spectroscopy, is reduced not only to a concentration of less than 6,000 ppm, preferably to a concentration of not higher than 3,000 ppm, more preferably to a concentration level of 2,000 ppm, or even more preferably to a concentration level of 0 to 2000 ppm.

In terms of achieving a sufficient catalytic activity and durability of the electrode reaction, it is more preferred that the chlorine (Cl) species concentration be not higher than 1,000 ppm, particularly preferably not higher than 100 ppm.

When the chlorine (Cl) species concentration is 1000 ppm or less, a decrease in the catalytic activity due to the chlorine (Cl) species can be sufficiently prevented. This is preferable because there can be fully exhibited a catalytic activity as an electrode catalyst.

Here, as for the production method of the electrode catalyst of the present invention, as a raw material of the electrode catalyst, there can even be used an electrode catalyst precursor exhibiting a chlorine (Cl) species concentration of not higher than 6,000 ppm. It is preferred that an electrode catalyst precursor with a further reduced chlorine (Cl) species concentration be used, because there can be reduced the number of operations for eliminating chlorine (Cl) species and the amount of ultrapure water used for such purpose.

(X-Ray Fluorescence (XRF) Spectroscopy)

The X-ray fluorescence (XRF) spectroscopy is, for example, performed in the following manner.

(1) Measurement Device
Full-automatic wavelength dispersive fluorescent X-ray analyzer Axios (by Spectris Co., Ltd.)

(2) Measurement Condition
Analysis software: "UniQuant 5" (Semi-quantitative analysis software employing FP (four peak method))
XRF measurement chamber atmosphere: Helium (normal pressure)

(3) Measurement Procedure
(i) Placing a sample-containing sample container into an XRF sample chamber
(ii) Replacing an atmosphere in the XRF sample chamber with helium gas
(iii) Setting the measurement condition to "UQ5 application" as a condition required to use the analysis software "UniQuant 5" and configuring a mode where calculation is performed in a mode with the main component of the sample being "carbon (constituent element of support)" and with a sample analysis result-display format being "element," under a helium gas atmosphere (normal pressure)

<Structure of Fuel Cell Stack>

Figure 10:
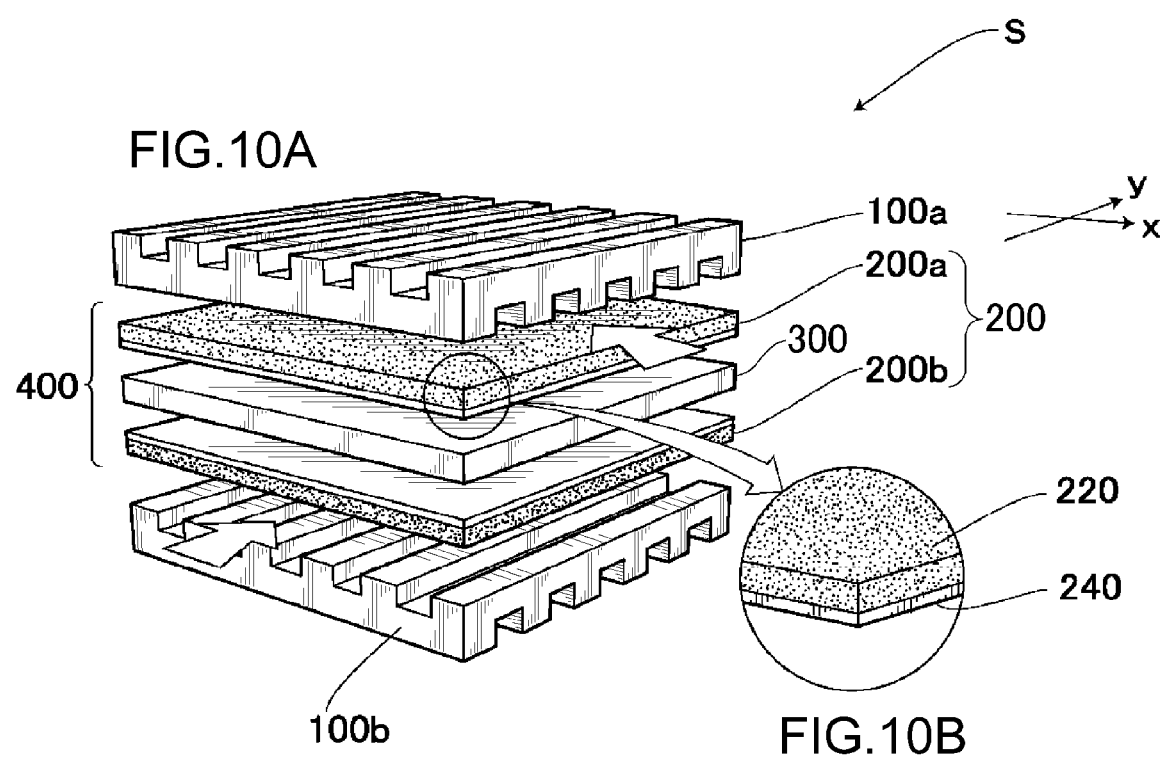
FIG. 10 is a schematic diagram showing a preferred embodiment of the fuel cell stack of the present invention.

FIG. 10 is a schematic view showing preferable embodiments of a composition for forming gas diffusion electrode containing the electrode catalyst of the present invention; a gas diffusion electrode produced using such composition for forming gas diffusion electrode; a membrane-electrode assembly (MEA) having such gas diffusion electrode; and a fuel cell stack having such membrane-electrode assembly (MEA).

As for a fuel cell stack S shown in FIG. 10, each membrane-electrode assembly (MEA) 400 serves as a one-unit cell, and the fuel cell stack S is configured by stacking multiple layers of such one-unit cells.

Particularly, the fuel cell stack S has a membrane-electrode assembly (MEA) 400 that is equipped with an anode 200a, a cathode 200b and an electrolyte membrane 300 provided between these electrodes.

More particularly, the fuel cell stack S has a structure where the membrane-electrode assembly (MEA) is sandwiched between a separator 100a and a separator 100b.

Described hereunder are the composition for forming gas diffusion electrode, a gas diffusion electrode 200a, a gas diffusion electrode 200b and the membrane-electrode assembly (MEA) 400, all of which serve as members of the fuel cell stack S containing the electrode catalyst of the present invention.

<Composition for Forming Gas Diffusion Electrode>

The electrode catalyst 1 can be used as a so-called catalyst ink component and serve as the composition for forming gas diffusion electrode in the present invention. One feature of the composition for forming gas diffusion electrode in the present invention is that this composition contains the aforementioned electrode catalyst. The main components of the composition for forming gas diffusion electrode are the abovementioned electrode catalyst and an ionomer solution. The ionomer solution contains water, an alcohol and a polyelectrolyte exhibiting a hydrogen ion conductivity.

A mixing ratio between water and an alcohol in the ionomer solution can be any ratio, as long as it is the kind of ratio capable of endowing a viscosity suitable for applying to the electrode the composition for forming gas diffusion electrode. In general, it is preferred that an alcohol be contained in an amount of 0.1 to 50.0 parts by weight with respect to 100 parts by weight of water. Further, it is preferred that the alcohol contained in the ionomer solution be a monohydric alcohol or a polyhydric alcohol. Examples of a monohydric alcohol include methanol, ethanol, propanol and butanol. Examples of a polyhydric alcohol include dihydric alcohols or trihydric alcohols. As a dihydric alcohol, there can be listed, for example, ethylene glycol, diethylene glycol, tetraethylene glycol, propylene glycol, 1,3-butanediol and 1,4-butanediol. As a trihydric alcohol, there may be used glycerin, for example. Further, the alcohol contained in the ionomer solution may be either one kind of alcohol or a combination of two or more kinds of alcohols. Here, the ionomer solution may also be appropriately allowed to contain an additive(s) such as a surfactant, if necessary.

For the purpose of dispersing the electrode catalyst, the ionomer solution contains a hydrogen ion-conductive polyelectrolyte as a binder component for improving an adhesion to a gas diffusion layer as a part composing the gas diffusion electrode. Although there are no particular restrictions on the polyelectrolyte, examples of such polyelectrolyte include known perfluorocarbon resins having sulfonate groups and/or carboxylic acid groups. As an easily obtainable hydrogen ion-conductive polyelectrolyte, there can be listed, for example, Nafion (registered trademark of Du Pont), ACIPLEX (registered trademark of Asahi Kasei Chemical Corporation) and Flemion (registered trademark of ASAHI GLASS Co., Ltd).

The composition for forming gas diffusion electrode can be produced by mixing, crushing and stirring the electrode catalyst and the ionomer solution. The composition for forming gas diffusion electrode may be prepared using crushing and mixing machines such as a ball mill and/or an ultrasonic disperser. A crushing and a stirring conditions at the time of operating a crushing and mixing machine can be appropriately determined in accordance with the mode of the composition for forming gas diffusion electrode.

It is required that the composition of each of the electrode catalyst, water, alcohol(s) and hydrogen ion-conductive polyelectrolyte that are contained in the composition for forming gas diffusion electrode be that capable of achieving a favorable dispersion state of the electrode catalyst, allowing the electrode catalyst to be distributed throughout an entire catalyst layer of the gas diffusion electrode and improving the power generation performance of the fuel cell.

Particularly, it is preferred that the polyelectrolyte, alcohol(s) and water be respectively contained in an amount of 0.1 to 2.0 parts by weight, an amount of 0.01 to 2.0 parts by weight and an amount of 2.0 to 20.0 parts by weight with respect to 1.0 parts by weight of the electrode catalyst. It is more preferred that the polyelectrolyte, alcohol(s) and water be respectively contained in an amount of 0.3 to 1.0 parts by weight, an amount of 0.1 to 2.0 parts by weight and an amount of 5.0 to 6.0 parts by weight with respect to 1.0 parts by weight of the electrode catalyst. It is preferred that the composition of each component be within the abovementioned ranges, because when the composition of each component is within these ranges, not only a coating film made of the composition for forming gas diffusion electrode will not be spread extremely extensively on the gas diffusion electrode at the time of forming the film, but the coating film formed of the composition for forming gas diffusion electrode is also allowed to have an appropriate and uniform thickness.

Here, the weight of the polyelectrolyte refers to a weight when it is dry i.e. a weight without a solvent in a polyelectrolyte solution, whereas the weight of water refers to a weight including water contained in the polyelectrolyte solution.

<Gas Diffusion Electrode>

The gas diffusion electrode (200a, 200b) of the present invention has a gas diffusion layer 220; and an electrode catalyst layer 240 laminated on at least one surface of the gas diffusion layer 220. The aforementioned electrode catalyst is contained in the electrode catalyst layer 240 equipped to the gas diffusion electrode (200a, 200b). The gas diffusion electrode 200 of the present invention can be used as an anode and an cathode.

In FIG. 10, the gas diffusion electrode 200 on the upper side is referred to as the anode 200a, whereas the gas diffusion electrode 200 on the lower side is referred to as the cathode 200b for the sake of convenience.

(Electrode Catalyst Layer)

In the case of the anode 200a, the electrode catalyst layer 240 serves as a layer where a chemical reaction of dissociating a hydrogen gas sent from the gas diffusion layer 220 into hydrogen ions takes place due to the function of the electrode catalyst 1 contained in the electrode catalyst layer 240. Further, in the case of the cathode 200b, the electrode catalyst layer 240 serves as a layer where a chemical reaction of bonding an air (oxygen gas) sent from the gas diffusion layer 220 and the hydrogen ions that have traveled from the anode through the electrolyte membrane takes place due to the function of the electrode catalyst 1 contained in the electrode catalyst layer 240.

The electrode catalyst layer 240 is formed using the abovementioned composition for forming gas diffusion electrode. It is preferred that the electrode catalyst layer 240 have a large surface area such that the reaction between the electrode catalyst 1 and the hydrogen gas or air (oxygen gas) sent from the diffusion layer 220 is allowed take place to the fullest extent. Moreover, it is preferred that the electrode catalyst layer 240 be formed in a manner such that the electrode catalyst layer 240 has a uniform thickness as a whole. Although the thickness of the electrode catalyst layer 240 can be appropriately adjusted and there are no restrictions on such thickness, it is preferred that the electrode catalyst layer 240 have a thickness of 2 to 200 μm.

(Gas Diffusion Layer)

The gas diffusion layer 220 equipped to the gas diffusion electrode 200 serves as a layer provided to diffuse to each of the corresponding electrode catalyst layers 240 the hydrogen gas introduced from outside the fuel cell stack S into gas flow passages that are formed between the separator 100a and the gas diffusion layer 220a; and the air (oxygen gas) introduced from outside the fuel cell stack S into gas passages that are formed between the separator 100b and the gas diffusion layer 220b. In addition, the gas diffusion layer 220 plays a role of supporting the electrode catalyst layer 240 to the gas diffusion electrode 200 so as to immobilize the electrode catalyst layer 240 to the surface of the gas diffusion electrode 220. The gas diffusion layer 220 also plays a role of improving the contact between the electrode catalyst 1 contained in the electrode catalyst layer 240 and the hydrogen gas as well as air (oxygen gas).

The gas diffusion layer 220 has a function of favorably passing the hydrogen gas or air (oxygen gas) supplied from the gas diffusion layer 220 and then allowing such hydrogen gas or air to arrive at the electrode catalyst layer 240. For this reason, it is preferred that the gas diffusion layer 220 have a water-repellent property such that a pore structure as a microstructure in the gas diffusion layer 220 will not be blocked by the electrode catalyst 1 and water generated at the cathode 200b. Therefore, the gas diffusion layer 220 has a water repellent component such as polyethylene terephthalate (PTFE).

There are no particular restrictions on a material(s) that can be used in the gas diffusion layer 220. That is, there can be employed a material(s) known to be used in a gas diffusion layer of a fuel cell electrode. For example, there may be used a carbon paper; or a material made of a carbon paper as a main raw material and an auxiliary raw material applied to the carbon paper as the main raw material, such auxiliary raw material being composed of a carbon powder as an optional ingredient, an ion-exchange water also as an optional ingredient and a polyethylene terephthalate dispersion as a binder. The thickness of the gas diffusion layer can be appropriately determined based on, for example, the size of a cell used in a fuel cell. While there are no particular restrictions on the thickness of the gas diffusion layer, a thin gas diffusion layer is preferred for the purpose of ensuring a short diffusion distance of a reactant gas. Meanwhile, since it is required that the gas diffusion layer also exhibit a mechanical strength at the time of performing coating and during an assembly process, there is usually used a gas diffusion layer having a thickness of about 50 to 300 pun, for example.

As for the gas diffusion electrodes 200a and 200b, an intermediate layer (not shown) may be provided between the gas diffusion layer 220 and the electrode catalyst layer 240. In such case, each of the gas diffusion electrodes 200a and 200b has a three-layered structure composed the gas diffusion layer, the intermediate layer and the catalyst layer.

(Production Method of Gas Diffusion Electrode)

A production method of the gas diffusion electrode is described hereunder. The production method of the gas diffusion electrode includes a step of applying to the gas diffusion layer 220 the composition for forming gas diffusion electrode; and a step of forming the electrode catalyst layer 240 by drying such gas diffusion layer 220 to which the composition for forming gas diffusion electrode has been applied. Specifically, the composition for forming gas diffusion electrode contains the ionomer solution composed of the electrode catalyst 1 with the catalyst components supported on the support; a hydrogen ion-conductive polyelectrolyte; water; and an alcohol(s).

The important point when applying to the gas diffusion layer 220 the composition for forming gas diffusion electrode is that the composition for forming gas diffusion electrode is to be homogeneously applied to the gas diffusion layer 220. As a result of homogeneously applying the composition for forming gas diffusion electrode, there can be formed on the gas diffusion layer 220 a coating film that has a uniform thickness and is made of the composition for forming gas diffusion electrode. Although an application quantity of the composition for forming gas diffusion electrode can be appropriately determined based on a mode of usage of the fuel cell, it is preferred that the quantity be 0.1 to 0.5 (mg/cm$^2$) in terms of the amount of an active metal such as platinum contained in the electrode catalyst layer 240, from the perspective of a cell performance of a fuel cell having a gas diffusion electrode.

Next, after applying to the gas diffusion layer 220 the composition for forming gas diffusion electrode, the coating film of the composition for forming gas diffusion electrode that has been applied to the gas diffusion layer 220 is dried so as to form the electrode catalyst layer 240 on the gas diffusion layer 220. By heating the gas diffusion layer 220 on which the coating film of the composition for forming gas diffusion electrode has been formed, the water and alcohol (s) in the ionomer solution contained in the composition for forming gas diffusion electrode will be evaporated and thus disappear from the composition for forming gas diffusion electrode. As a result, in the step of applying the composition for forming gas diffusion electrode, the coating film of the composition for forming gas diffusion electrode that is formed on the gas diffusion layer 220 becomes the electrode catalyst layer 240 containing the electrode catalyst and polyelectrolyte.

<Membrane-Electrode Assembly (MEA)>

The membrane-electrode assembly 400 of the present invention (Membrane Electrode Assembly, abbreviated as MEA hereunder) has the anode 200a and cathode 200b which serve as the gas diffusion electrodes 200 using the electrode catalyst 1; and the electrolyte membrane 300 dividing these electrodes. The membrane-electrode assembly (MEA) 400 can be produced by stacking the anode 200a, the electrolyte membrane 300 and the cathode 200b in an order of anode 200a, electrolyte 300 and cathode 200b, and then pressure-bonding the same.

<Fuel Cell Stack>

As for the fuel cell stack S of the present invention, the one-unit cell (single cell) is established with the separator 100a (anode side) being attached to an outer side of the anode 200a of the membrane-electrode assembly (MEA) 400 obtained, and with the separator 100b (cathode side) being attached to an outer side of the cathode 200b of the membrane-electrode assembly (MEA) 400, respectively. Further, the fuel cell stack S is obtained by integrating such one-unit cells (single cells). Furthermore, a fuel cell system is completed by attaching a peripheral device(s) to the fuel cell stack S and assembling the same.

WORKING EXAMPLE

The present invention is described in greater detail hereunder with reference to working examples. However, the present invention is not limited to the following working examples.

Here, the inventors of the present invention confirmed that iodine (I) species was not detected from the catalysts of the working and comparative examples, when employing the X-ray fluorescence (XRF) spectroscopy.

Further, unless otherwise noted in the description of each step of the following production method, these steps were carried out under a room temperature and in the air.

<Production of Electrode Catalyst Precursor>

Production Example 1

The electrode catalyst was produced by the electrode catalyst production method of the present invention through following process. The raw materials of the electrode catalyst that were used in the production examples are as follows.

Carbon black powder: product name "Ketjen Black EC300" (by Ketjen Black International Co.)
Sodium tetrachloropalladate (II)
Palladium nitrate
Potassium chloroplatinate

[Preparation of Palladium-Supported Carbon]

As a support of the electrode catalyst, there was used a carbon black powder which was dispersed in water to prepare a dispersion liquid of 5.0 g/L. An aqueous solution of sodium tetrachloropalladate (II) (concentration 20% by mass) of 5 mL was then delivered by drops into and mixed with such dispersion liquid. An aqueous solution of sodium formate (100 g/L) of 100 mL was further delivered by drops into a dispersion liquid thus obtained, followed by taking the insoluble components through filtering and then washing the taken insoluble components with a pure water. After performing drying, there was then obtained a palladium (core)-supported carbon with palladium being supported on carbon black.

[Copper (Cu) Covering Palladium (Core)]

An aqueous solution of copper sulfate of 50 mM was poured into a three-electrode electrolytic cell. A reasonable amount of the palladium-supported carbon prepared above was then added to such three-electrode electrolytic cell, followed by stirring the same and then allowing the three-electrode electrolytic cell to stand still. 450 mV (pair reversible hydrogen electrode) was applied to the working electrode in a resting state such that copper (Cu) could uniformly coat the palladium of the palladium-supported carbon. This is defined as a copper-palladium supported carbon.

[Platinum (Pt) Covering Palladium (Core)]

An aqueous solution of potassium chloroplatinic acid was delivered by drops into the solution containing the copper-palladium supported carbon with palladium being coated by copper, the aqueous solution of potassium chloroplatinic acid containing platinum (Pt) in an amount two-fold equivalent of the coating copper in terms of substance amount ratio. In this way, the copper (Cu) of the copper-palladium supported carbon was replaced with platinum (Pt)

[Pretreatment]

Step (P1): A P1 liquid was prepared by dispersing in ultrapure water an undried powder of platinum palladium-supported carbon particles produced by substituting copper (Cu) of the above-obtained copper-palladium supported carbon with platinum (Pt).

Step (P2): The P1 liquid was filtrated and washed with the ultrapure water, using a filtration device. Washing was repeated until the electric conductivity of the filtrate obtained after washing had become not higher than 10 µS/cm. An electrode catalyst precursor thus obtained was then dispersed in the ultrapure water to obtain an electrode catalyst precursor-ultrapure water dispersion liquid (I).

Step (P3): Next, the dispersion liquid (I) was filtrated, and a filtration residue thus obtained was dried in the air at 70° C. and for about 24 hours. In this way, the electrode catalyst precursor 1 obtained in the production example 1 was produced.

Production Examples 2 to 6

Electrode catalyst precursors 2 to 6 of production examples 2 to 6 were respectively obtained in a similar manner as the production example 1 except that the supported amounts of platinum (Pt) and palladium (Pd) contained in the electrode catalyst became those represented by the concentrations (% by mass concentration) as set forth in the working example 7, comparative examples 3 to 5 and comparative example 2 of Table 1.

As described later, as for the electrode catalyst precursors 1 to 6, it was confirmed that their chlorine (Cl) species concentrations, as measured by XRF spectroscopy, were not lower than 6,000 ppm as set forth in Table 1.

Thus, in the following working examples, the first chlorine (Cl) species concentration of the electrode catalyst precursor as the raw material is 6,000 ppm.

<Production of Electrode Catalyst>

Working Example 1

[First Step']

The pretreated electrode catalyst precursor 1 obtained in production example 1 was taken by an amount of 5.0 g, and was put into a container. Next, ultrapure water of 1,000 mL was added to such container, followed by aerating a solution thus obtained with a hydrogen gas (about 100%) at a rate of about 10 mL/min for about 60 min while retaining this solution at a room temperature (25° C.).

[Fifth Step]

The solution aerated with the hydrogen gas was then filtrated and a filtration residue obtained was dried in the air at 70° C. for about 24 hours, thereby obtaining the electrode catalyst. The electrode catalyst obtained in the working example 1 was defined as a catalyst 1.

[Measurement of Supported Amount]

With regard to the catalyst 1, the amounts (% by mass) of the platinum and palladium supported were measured by the following method.

The catalyst 1 was immersed in an aqua regia to dissolve the metal. Then, carbon as an insoluble component was removed from the aqua regia. Next, the aqua regia from which carbon had been removed was subjected to ICP analysis.

The results of ICP analysis were that a platinum supporting amount was 20.9% by mass, and a palladium supporting amount was 22.5% by mass.

Working Example 2

[First Step]

The electrode catalyst precursor 1 obtained in the production example 1 was taken by an amount of 5.0 g, and was put into a container. Next, 1,000 (mL) of a sodium formate aqueous solution of a concentration of 0.01 M was added to such container, and an aqueous dispersion liquid obtained was then retained while being stirred at a room temperature (25° C.) for about 240 min.

[Second Step to Fourth Step]

A dispersion liquid (first liquid) was obtained by adding ultrapure water to the liquid obtained after the first step.

Next, ultrapure water was used to filtrate off the insoluble components contained in the abovementioned dispersion liquid, and perform washing. Washing was performed repeatedly until the electric conductivity of the filtrate obtained after washing had become not higher than 10 μS/cm, and an electrode catalyst precursor thus obtained was then dispersed in ultrapure water to obtain an electrode catalyst precursor-ultrapure water dispersion liquid (second liquid, referred to hereinafter as "dispersion liquid (II)"). The dispersion liquid (II) was then filtrated, and a filtration residue obtained was dried at 70° C. in the air for 24 hours so as to obtain the electrode catalyst. The electrode catalyst obtained in the working example 2 was defined as a catalyst 2.

ICP analysis was performed on the catalyst 2 in an similar manner as the working example 1 to measure the supported amount of platinum and the supported amount of palladium that are shown in Table 1.

Working Example 3

An electrode catalyst was obtained in a similar manner as the working example 2 except that in the working example 2, the retention temperature of the first step was changed from a room temperature to 90° C., and the first to the fourth steps were carried out in a way such that the first to the fourth steps were combined together as a set to be repeated for a given number of times.

The electrode catalyst obtained in the working example 3 was defined as a catalyst 3.

ICP analysis was performed on the catalyst 3 in an similar manner as the working example 1 to measure the supported amount of platinum and the supported amount of palladium that are shown in Table 1.

Working Example 4

In the working example 3, the catalyst 3 obtained was subjected to an acid treatment by being submerged in a sulfuric acid aqueous solution of 0.05 M Washing was repeated until the electric conductivity of the filtrate obtained after washing had become not higher than 10 μS/cm, and a filtration residue obtained was then dispersed in ultrapure water, thus obtaining an electrode catalyst precursor-ultrapure water dispersion liquid (referred to as "dispersion liquid (III)" hereunder)

Next, such dispersion liquid (III) was filtrated, and a filtration residue obtained was dried at 70° C. in the air for about 24 hours. In this manner, an electrode catalyst was obtained. The electrode catalyst obtained in the working example 4 was defined as a catalyst 4.

ICP analysis was performed on the catalyst 4 in an similar manner as the working example 1 to measure the supported amount of platinum and the supported amount of palladium that are shown in Table 1.

Working Example 5

An electrode catalyst was obtained in a similar manner as the working example 2 except that in the working example 2, the sodium formate aqueous solution of the first step was now changed to a sodium carbonate aqueous solution. The electrode catalyst obtained in the working example 5 was defined as a catalyst 5.

ICP analysis was performed on the catalyst 5 in a similar manner as the working example 1 to measure the supported amount of platinum and the supported amount of palladium that are shown in Table 1.

Working Example 6

An electrode catalyst was obtained in a similar manner as the working example 2 except that in the working example 5, the retention temperature was now changed to 90° C. The electrode catalyst obtained in the working example 6 was defined as a catalyst 6.

ICP analysis was performed on the catalyst 6 in a similar manner as the working example 1 to measure the supported amount of platinum and the supported amount of palladium that are shown in Table 1.

Working Examples 7 and 8

An electrode catalyst was obtained in a similar manner as the working example 2 except that the electrode catalyst precursor 2 obtained in the production example 2 and the electrode catalyst precursor 3 obtained in the production example 3 were used respectively. The electrode catalyst obtained in the working example 7 was defined as a catalyst 7. And, the electrode catalyst obtained in the working example 8 was defined as a catalyst 8.

ICP analysis was performed on the catalyst 7 and the catalyst 8 in a similar manner as the working example 1 to measure the supported amount of platinum and the supported amount of palladium that are shown in Table 1.

Working Examples 9 to 11, Working Example 13

An electrode catalyst was obtained in a similar manner as the working example 3 except that as compared to the working example 3, sodium formate was changed to oxalic acid, the concentration of an oxalic acid aqueous solution was set to be 0.3 M, and the catalyst precursor 4 obtained in the production example 4 was used.

The electrode catalysts obtained in the working examples 9 to 11, and the working example 13 were individually defined as catalysts 9 to 11, and a catalyst 13.

ICP analysis was performed on the catalysts 9 to 11, and the catalyst 13 in a similar manner as the working example 1 to measure the supported amount of platinum and the supported amount of palladium that are shown in Table 1.

Working Example 12

An electrode catalyst was obtained in a similar manner as the working example 9 except that as compared to the working example 9, the temperature at which an oxalic acid aqueous solution was used to perform immersion was set to be a room temperature (about 25° C.).

The electrode catalyst obtained in the working example 12 is defined as a catalyst 12.

ICP analysis was performed on the catalyst 12 in a similar manner as the working example 1 to measure the supported amount of platinum and the supported amount of palladium that are shown in Table 1.

Working Example 14

[First Step]

The electrode catalyst precursor 5 (5.0 g) obtained in the production example 5 was immersed in a sodium formate aqueous solution (0.01 M), and was retained at a room temperature for a predetermined time.

Next, the electrode catalyst precursor in the sodium formic aqueous solution was filtrated and washed with ultrapure water.

This was further immersed in a sulfuric acid aqueous solution (1M) at a normal temperature for predetermined time. Next, the electrode catalyst precursor in the sulfuric acid aqueous solution was filtrated and washed with ultrapure water. Then, the electrode catalyst precursor was immersed in an oxalic acid aqueous solution (0.3 M), and was retained at 90° C. for a predetermined time.

[Second Step to Fourth Step]

A dispersion liquid (first liquid) was obtained by adding ultrapure water to the liquid obtained after the first step.

Next, ultrapure water was used to filtrate off the insoluble components contained in the dispersion liquid, and perform washing. Washing was repeatedly performed until an electric conductivity of a filtrate obtained after washing had become not higher than 10 μS/cm, and an electrode catalyst precursor obtained was dispersed in ultrapure water so as to obtain an electrode catalyst precursor-ultrapure water dispersion liquid (second liquid, referred to as "dispersion liquid (IV)").

Next, the dispersion liquid (IV) was filtrated, and a filtration residue obtained was dried at 70° C. so as to obtain an electrode catalyst.

The electrode catalyst obtained in the working example 14 is defined as a catalyst 14.

ICP analysis was performed on the catalyst 14 in a similar manner as the working example 1 to measure the supported amount of platinum and the supported amount of palladium that are shown in Table 1.

Comparative Examples 1 to 5

The electrode catalyst precursors 1, 6, 3, 4 and 5 produced in the production examples 1, 6, 3, 4 and 5 were individually defined as the electrode catalysts of the comparative examples 1 to 5.

<Evaluation of Electrode Catalysts>
(Concentrations of Chlorine (Cl) Species)

X-ray fluorescence (XRF) spectrometry was employed to measure the concentrations of the chlorine (Cl) species of the electrode catalysts that are obtained in the working examples 1 to 14, and the comparative examples 1 to 5. The concentrations of the chlorine species in the electrode catalysts were measured using the wavelength dispersive fluorescent X-ray analyzer Axios (by Spectris Co., Ltd.). Specifically, the measurement was carried out through the following procedure.

A measurement sample of the electrode catalyst was placed in a XRF sample container equipped to the wavelength dispersive fluorescent X-ray analyzer. The XRF sample container in which the measurement sample of the electrode catalyst had been placed was then put into an XRF sample chamber, followed by replacing an atmosphere in the XRF sample chamber with a helium gas. Later, fluorescent X-ray measurement was conducted under the helium gas atmosphere (normal pressure).

As a software, there was used "UniQuant5" which is an analytic software for use in wavelength dispersive fluorescent X-ray analyzer. A measurement condition(s) were set to "UQ5 application" in accordance with the analytic software "UniQuant5," where calculation is performed in a mode with the main component of the measurement sample of the electrode catalyst being "carbon (constituent element of electrode catalyst support)" and with a sample analysis result-display format being "element." Measurement results were analyzed using the analytic software "UniQuant5" such that the concentrations of chlorine (Cl) species were able to be calculated. The measurement results are shown in Table 1.

For these reasons, the present invention is a production method of electrode catalyst that can be used not only in fuel-cell vehicles and electrical equipment industries such as those related to cellular mobiles, but also in Ene farms, cogeneration systems or the like. Thus, the electrode catalyst

TABLE 1

|  |  | lectrode catalyst precursor | Reductant | Pt/ % by mass | Pd/ % by mass | Chlorine species concentration/ppm |
|---|---|---|---|---|---|---|
| Working examples | 1 | 1 | Hydrogen gas | 20.9 | 22.5 | 100 |
|  | 2 |  | Sodium formate | 20.9 | 22.5 | 0 |
|  | 3 |  | Sodium formate | 21.0 | 22.9 | 0 |
|  | 4 |  | Sodium formate | 20.9 | 22.5 | 300 |
|  | 5 |  | Sodium carbonate | 20.9 | 22.5 | 2600 |
|  | 6 |  | Sodium carbonate | 20.9 | 22.5 | 500 |
|  | 7 | 2 | Sodium formate | 22.8 | 22.7 | 0 |
|  | 8 | 3 | Sodium formate | 19.6 | 24.4 | 0 |
|  | 9 | 4 | Oxalic acid | 23.5 | 21.5 | 900 |
|  | 10 |  | Oxalic acid | 23.5 | 21.5 | 400 |
|  | 11 |  | Oxalic acid | 23.5 | 21.5 | 1000 |
|  | 12 |  | Oxalic acid | 23.5 | 21.5 | 1200 |
|  | 13 |  | Oxalic acid | 23.5 | 21.5 | 700 |
|  | 14 | 5 | Sodium formate + Oxalic acid | 20.0 | 23.5 | 0 |
| Compaprative examples | 1 | 1 | None | 20.9 | 22.5 | 6900 |
|  | 2 | 6 | None | 24.3 | 21.2 | 8500 |
|  | 3 | 3 | None | 19.5 | 24.2 | 6000 |
|  | 4 | 4 | None | 23.5 | 21.5 | 7800 |
|  | 5 | 5 | None | 19.8 | 24.3 | 7300 |

According to Table 1, the following became evident. That is, as for the production method of the electrode catalyst of the present invention, even when employing as a raw material an electrode catalyst precursor containing high-concentration chlorine (Cl) species, by applying the particular chlorine (Cl) species elimination method to such electrode catalyst precursor, there can be easily produced an electrode catalyst whose chlorine (Cl) species concentration has been greatly reduced not only to a concentration of less than 3,000 ppm, but also to a concentration of not higher than 1,000 ppm, or even to a concentration level of about 0 to about 1,000 ppm, even in the case where the chlorine (Cl) species concentration of the electrode catalyst precursor is not lower than 6,000 ppm (i.e. when the first chlorine concentration or the second chlorine concentration is not lower than 6,000 ppm).

Further, according to Table 1, it became clear that as compared to an electrode catalyst obtained without applying a particular chlorine (Cl) species elimination method to an electrode catalyst precursor, the electrode catalyst obtained by the production method of the electrode catalyst of the present invention was able to sufficiently reduce the content of chlorine (Cl) species, and thus prevent a decrease in catalytic activity which is incurred by chlorine (Cl) species.

These results indicate that the production method of the electrode catalyst of the present invention is suitable for mass production and reducing the production costs.

According to the production method of the electrode catalyst of the present invention, even when using an electrode catalyst precursor having a high-concentration chlorine content, there can be obtained an electrode catalyst whose chlorine (Cl) species content has been reliably and sufficiently reduced, through relatively simple operations.

Further, the production method of the electrode catalyst of the present invention is capable of simplifying the production process and reducing the production costs.

of the present invention shall make contributions to the energy industries and developments related to environmental technologies.

The invention claimed is:

1. A production method of an electrode catalyst having a core-shell structure including a support, a core part formed on said support and a shell part formed to cover at least a part of a surface of said core part, comprising:

a first step (1) of retaining a liquid containing ultrapure water, a reductant and an electrode catalyst precursor under at least one stage of a temperature predetermined within a range of 10 to 95° C. for a predetermined retention time, said electrode catalyst precursor being produced using a material containing chlorine (Cl) species, and exhibiting a chlorine (Cl) species concentration not lower than a predetermined first chlorine (Cl) species concentration when measured by X-ray fluorescence (XRF) spectroscopy;

a second step (2) of preparing a first liquid with the catalyst precursor contained in said liquid obtained after said first step being dispersed in ultrapure water, by adding ultrapure water to said liquid obtained after said first step;

a third step (3) of preparing a second liquid by filtrating and washing the catalyst precursor contained in said first liquid with ultrapure water, and then repeatedly performing washing until an electric conductivity ρ of a filtrate obtained after washing has become not higher than a first predetermined value when measured by a JIS-standard testing method (JIS K0552), such that dispersed in ultrapure water is the catalyst precursor contained in said liquid exhibiting an electric conductivity ρ not higher than said first predetermined value; and a fourth step (4) of drying said second liquid.

2. The production method of the electrode catalyst according to claim 1, wherein said first chlorine (Cl) species concentration is 6,000 ppm.

3. The production method of the electrode catalyst according to claim 1, wherein said reductant is at least one kind of compound selected from an organic acid and an organic acid salt.

4. The production method of the electrode catalyst according to claim 1, wherein said reductant is at least one kind of compound selected from the group consisting of formic acid, sodium formate, oxalic acid and sodium oxalate.

5. The production method of the electrode catalyst according to claim 1, wherein said reductant is at least one kind of compound selected from an inorganic acid and an inorganic acid salt.

6. The production method of the electrode catalyst according to claim 1, wherein said reductant is at least one kind of compound selected from the group consisting of carbonic acid, sodium carbonate, thiosulfuric acid, sodium thiosulfate and hydrogen sulfide.

7. The production method of the electrode catalyst according to claim 1, further comprising a fifth step (5) of drying the dispersion liquid obtained after said first step.

8. The production method of the electrode catalyst according to claim 7, wherein said electrode catalyst precursor used in said first step is subjected to a pretreatment process comprising:
   a step (P1) of preparing a P1 liquid with an electrode catalyst precursor being dispersed in ultrapure water by adding said electrode catalyst precursor (PI) to the ultrapure water, said electrode catalyst precursor being produced using a material containing chlorine (Cl) species, and exhibiting a chlorine (Cl) species concentration not lower than a predetermined second chlorine (Cl) species concentration when measured by X-ray fluorescence (XRF) spectroscopy;
   a step (P2) of preparing a P2 liquid by dispersing an electrode catalyst precursor in ultrapure water, said electrode catalyst precursor being obtained by washing said electrode catalyst precursor contained in said P1 liquid with ultrapure water, and then repeatedly performing washing until an electric conductivity $\rho$ of a filtrate obtained after washing has become not higher than a predetermined value of the step P1 when measured by the JIS-standard testing method (JIS K0552); and
   a step (P3) of drying said P2 liquid.

9. The production method of the electrode catalyst according to claim 1, wherein said first predetermined value is a value selected from a range of not higher than 100 μS/cm.

10. The production method of the electrode catalyst according to claim 1, wherein said electrode catalyst precursor used in said first step is subjected to a pretreatment process comprising:
    a step (P1) of preparing a P1 liquid with an electrode catalyst precursor being dispersed in ultrapure water by adding said electrode catalyst precursor (PI) to the ultrapure water, said electrode catalyst precursor being produced using a material containing chlorine (Cl) species, and exhibiting a chlorine (Cl) species concentration not lower than a predetermined second chlorine (Cl) species concentration when measured by X-ray fluorescence (XRF) spectroscopy;
    a step (P2) of preparing a P2 liquid by dispersing an electrode catalyst precursor in ultrapure water, said electrode catalyst precursor being obtained by washing said electrode catalyst precursor contained in said P1 liquid with ultrapure water, and then repeatedly performing washing until an electric conductivity $\rho$ of a filtrate obtained after washing has become not higher than a predetermined value of the step P1 when measured by the JIS-standard testing method (JIS K0552); and
    a step (P3) of drying said P2 liquid.

11. The production method of the electrode catalyst according to claim 10, wherein said second chlorine (Cl) species concentration is 6,000 ppm.

12. The production method of the electrode catalyst according to claim 10, wherein said predetermined value of the step P1 is a value selected from the range of not higher than 100 μS/cm.

13. The production method of the electrode catalyst according to claim 1, wherein said shell part contains at least one metal selected from platinum (Pt) and a platinum (Pt) alloy, and said core part contains at least one metal selected from the group consisting of palladium (Pd), a palladium (Pd) alloy, a platinum (Pt) alloy, gold (Au), nickel (Ni) and a nickel (Ni) alloy.

14. The production method of the electrode catalyst according to claim 13, wherein a platinum (Pt) chloride is used as a raw material of a metal constituting said shell part.

15. The production method of the electrode catalyst according to claim 1, wherein said shell part has:
    a first shell part formed to cover at least a part of the surface of said core part; and
    a second shell part formed to cover at least a part of a surface of said first shell part.

16. The production method of the electrode catalyst according to claim 15, wherein a platinum (Pt) chloride is used as a raw material of a metal constituting said second shell part.

17. A production method of an electrode catalyst having a core-shell structure including a support, a core part formed on said support and a shell part formed to cover at least a part of a surface of said core part, comprising:
    a first step' (1') of retaining a liquid containing ultrapure water, a hydrogen-containing gas and an electrode catalyst precursor under at least one stage of a temperature predetermined within a range of 10 to 60° C. for a predetermined retention time, said electrode catalyst precursor being produced using a material containing chlorine (Cl) species, and exhibiting a chlorine (Cl) species concentration not lower than a predetermined first chlorine (Cl) species concentration when measured by X-ray fluorescence (XRF) spectroscopy.

18. The production method of the electrode catalyst according to claim 17, further comprising:
    a second step (2) of preparing a first liquid with the electrode catalyst precursor contained in said liquid obtained after said first step' being dispersed in ultrapure water, by adding ultrapure water to said liquid obtained after said first step';
    a third step (3) of preparing a second liquid by filtrating and washing the electrode catalyst precursor contained in said first liquid with ultrapure water, and then repeatedly performing washing until an electric conductivity $\rho$ of a filtrate obtained after washing has become not higher than a first predetermined value when measured by a JIS-standard testing method (JIS K0552), such that dispersed in ultrapure water is the electrode catalyst precursor contained in said liquid exhibiting an electric conductivity $\rho$ not higher than said first predetermined value; and
    a fourth step (4) of drying said second liquid.

19. The production method of the electrode catalyst according to claim 18, wherein said first predetermined value is a value selected from a range of not higher than 100 µS/cm.

20. The production method of the electrode catalyst according to claim 17, wherein said first chlorine (Cl) species concentration is 6,000 ppm.

21. The production method of the electrode catalyst according to claim 17, further comprising a fifth step (5) of drying the dispersion liquid obtained after said first step.

22. The production method of the electrode catalyst according to claim 21, wherein said electrode catalyst precursor used in said first step' is subjected to a pretreatment process comprising:
- a step (P1) of preparing a P1 liquid with an electrode catalyst precursor being dispersed in ultrapure water by adding said electrode catalyst precursor (PI) to the ultrapure water, said electrode catalyst precursor being produced using a material containing chlorine (Cl) species, and exhibiting a chlorine (Cl) species concentration not lower than a predetermined second chlorine (Cl) species concentration when measured by X-ray fluorescence (XRF) spectroscopy;
- a step (P2) of preparing a P2 liquid by dispersing an electrode catalyst precursor in ultrapure water, said electrode catalyst precursor being obtained by washing said electrode catalyst precursor contained in said P1 liquid with ultrapure water, and then repeatedly performing washing until an electric conductivity ρ of a filtrate obtained after washing has become not higher than a predetermined value of the step P1 when measured by the JIS-standard testing method (JIS K0552); and
- a step (P3) of drying said P2 liquid.

23. The production method of the electrode catalyst according to claim 17, wherein said electrode catalyst precursor used in said first step' is subjected to a pretreatment process comprising:
- a step (P1) of preparing a P1 liquid with an electrode catalyst precursor being dispersed in ultrapure water by adding said electrode catalyst precursor (PI) to the ultrapure water, said electrode catalyst precursor being produced using a material containing chlorine (Cl) species, and exhibiting a chlorine (Cl) species concentration not lower than a predetermined second chlorine (Cl) species concentration when measured by X-ray fluorescence (XRF) spectroscopy;
- a step (P2) of preparing a P2 liquid by dispersing an electrode catalyst precursor in ultrapure water, said electrode catalyst precursor being obtained by washing said electrode catalyst precursor contained in said P1 liquid with ultrapure water, and then repeatedly performing washing until an electric conductivity ρ of a filtrate obtained after washing has become not higher than a predetermined value of the step P1 when measured by the JIS-standard testing method (JIS K0552); and
- a step (P3) of drying said P2 liquid.

24. The production method of the electrode catalyst according to claim 17 wherein said shell part contains at least one metal selected from platinum (Pt) and a platinum (Pt) alloy, and said core part contains at least one metal selected from the group consisting of palladium (Pd), a palladium (Pd) alloy, a platinum (Pt) alloy, gold (Au), nickel (Ni) and a nickel (Ni) alloy.

25. The production method of the electrode catalyst according to claim 17, wherein said shell part has:
- a first shell part formed to cover at least a part of the surface of said core part; and
- a second shell part formed to cover at least a part of a surface of said first shell part.

26. The production method of the electrode catalyst according to claim 25, wherein a platinum (Pt) chloride is used as a raw material of a metal constituting said second shell part.

* * * * *